(12) United States Patent
Tse et al.

(10) Patent No.: US 7,905,263 B2
(45) Date of Patent: Mar. 15, 2011

(54) PROCESSABLE FILLED, CURABLE HALOGENATED ISOOLEFIN ELASTOMERS

(75) Inventors: Mun Fu Tse, Seabrook, TX (US); Dirk Frans Rouckhout, Grotesteenweg (BE); Donald Sheley Tracey, Kingwood, TX (US); Walter Harvey Waddell, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 429 days.

(21) Appl. No.: 11/791,820

(22) PCT Filed: Dec. 29, 2005

(86) PCT No.: PCT/US2005/047332
§ 371 (c)(1),
(2), (4) Date: May 29, 2007

(87) PCT Pub. No.: WO2006/071959
PCT Pub. Date: Jul. 6, 2006

(65) Prior Publication Data
US 2008/0023118 A1    Jan. 31, 2008

Related U.S. Application Data

(60) Provisional application No. 60/639,939, filed on Dec. 29, 2004.

(51) Int. Cl.
*B60C 5/00* (2006.01)
*B60C 5/14* (2006.01)
*B60C 1/00* (2006.01)
*C08F 36/00* (2006.01)

(52) U.S. Cl. .......... 152/510; 152/511; 152/512; 526/72; 526/89; 526/206; 526/335

(58) Field of Classification Search ........... 152/510, 152/511, 512, 72, 89, 206; 526/335
See application file for complete search history.

(56) References Cited

U.S. PATENT DOCUMENTS

| | | | |
|---|---|---|---|
| 5,063,268 | A | 11/1991 | Young |
| 5,071,913 | A | 12/1991 | Powers et al. |
| 5,162,445 | A | 11/1992 | Powers et al. |

(Continued)

FOREIGN PATENT DOCUMENTS

EP    0 922 732    6/1999

(Continued)

OTHER PUBLICATIONS

Material Safety Data Sheet, Exxon Mobil, Dec. 21, 2004.*

(Continued)

*Primary Examiner* — Justin Fischer

(57) ABSTRACT

The present invention provides an elastomeric composition processable in a curable, filled rubber formulation. The composition comprises a halogenated interpolymer of a $C_4$ to $C_7$ isoolefin and from 3 to 20 weight percent alkylstyrene and comprising from 0.2 to 2 mole percent haloalkylstyrene, a Mooney viscosity less than 37, a number average molecular weight less than 270,000, a weight average molecular weight less than 470,000, a z-average molecular weight less than 700,000, and a branching index (g') from 0.4 to 1.1. Also disclosed are a method of making a cured, filled rubber article, comprising compounding the elastomeric composition with filler and curative, processing the compounded composition to form a shape of the article, and curing the composition to obtain the article in the formed shape, as well as a tire comprising an innerliner made by the method.

17 Claims, 18 Drawing Sheets

U.S. PATENT DOCUMENTS

| | | | |
|---|---|---|---|
| 5,227,426 A | 7/1993 | Tse et al. | |
| 5,333,662 A | 8/1994 | Costemalle et al. | |
| 5,386,864 A | 2/1995 | Costemalle et al. | |
| 5,391,625 A | 2/1995 | Arjunan | |
| 5,576,372 A | 11/1996 | Kresge et al. | |
| 5,576,373 A | 11/1996 | Kresge et al. | |
| 5,656,694 A | 8/1997 | Frechet et al. | |
| 5,665,183 A | 9/1997 | Kresge et al. | |
| 5,681,899 A | 10/1997 | Wang et al. | |
| 5,807,629 A | 9/1998 | Elspass et al. | |
| 5,883,173 A | 3/1999 | Elspass et al. | |
| 5,936,023 A | 8/1999 | Kato et al. | |
| 5,973,053 A | 10/1999 | Usuki et al. | |
| 6,034,164 A | 3/2000 | Elspass et al. | |
| 6,051,653 A | 4/2000 | McElrath et al. | |
| 6,060,549 A | 5/2000 | Li et al. | |
| 6,103,817 A | 8/2000 | Usuki et al. | |
| 6,121,361 A | 9/2000 | Usuki et al. | |
| 6,293,327 B1 | 9/2001 | Minagawa et al. | |
| 6,624,220 B1 | 9/2003 | Waddell et al. | |
| 6,710,116 B1 | 3/2004 | Waddell et al. | |
| 7,514,491 B2 * | 4/2009 | Weng et al. | 524/445 |
| 2002/0100530 A1 | 8/2002 | McElrath et al. | |
| 2004/0249085 A1* | 12/2004 | Waddell et al. | 525/333.3 |
| 2005/0027062 A1 | 2/2005 | Waddell et al. | |
| 2007/0213444 A1 | 9/2007 | Weng et al. | |

FOREIGN PATENT DOCUMENTS

| | | |
|---|---|---|
| EP | 1 331 107 | 7/2003 |
| WO | WO 92/02582 | 2/1992 |
| WO | WO 92/03302 | 3/1992 |
| WO | WO 94/22680 | 10/1994 |
| WO | WO 96/34914 | 11/1996 |
| WO | WO 98/50464 | 11/1998 |
| WO | WO 01/85831 | 11/2001 |
| WO | WO 03/170438 | 12/2001 |
| WO | WO 03/192854 | 12/2001 |
| WO | WO 02/31048 | 4/2002 |
| WO | WO 02/48257 | 6/2002 |
| WO | WO 02/059194 | 8/2002 |
| WO | WO 02/100935 | 12/2002 |
| WO | WO 02/100936 | 12/2002 |
| WO | WO 03/050149 | 6/2003 |
| WO | WO 2004/058825 | 7/2004 |
| WO | WO 2004/058874 | 7/2004 |
| WO | WO2004/081106 | 9/2004 |
| WO | WO2005/017013 | 2/2005 |
| WO | WO 2006/002033 | 1/2006 |
| WO | WO 2006/071959 | 7/2006 |

OTHER PUBLICATIONS

W. Barbin et al., Chapter 9 in *Science and Technology of Rubber*, J. E. Mark et al. Eds., 2nd Ed., Academic Press: New York, (1994).

M. F. Tse, "Green Tack of Butyl Polymers", *Polym. Prepr.*, vol. 45, No. 1, p. 980 (2004); (see Strol, *The Physics of Polymers*, $2^{nd}$ Edition, Springer, Germany (1997).

W. Tobolsky, *Properties and Structure of Polymers*, John Wiley & Sons, Inc., New York, NY, p. 219 (1960).

* cited by examiner

PROCESSABLE FILLED, CURABLE HALOGENATED ISOOLEFIN ELASTOMERS

CROSS REFERENCE TO RELATED APPLICATION

This application is a 371 National Stage Application of International Application No. PCT/US2005/047332, filed Dec. 29, 2005, which claims the benefit of U.S. Provisional Application Ser. No. 60/639,939, filed Dec. 29, 2004, the disclosures of which are herein incorporated by reference in their entireties.

FIELD OF THE INVENTION

This invention relates to elastomers having improved green compound processability, and more particularly to filled elastomer compositions having utility as a tire innerliner wherein the uncured composition has a fast stress relaxation when strained to a prescribed deformation.

BACKGROUND OF THE INVENTION

Halobutyl rubbers, which are halogenated isobutylene/isoprene copolymers, are the polymers of choice for best air retention in tires for passenger, truck, bus and aircraft vehicles. Bromobutyl rubber, chlorobutyl rubber and halogenated star-branched butyl rubbers can be formulated for specific tire applications, such as tubes or innerliners. The selection of ingredients and additives for the final commercial formulation depends upon the balance of properties desired, namely, processability and tack of the green (uncured) compound in the tire plant versus the in-service performance of the cured tire composite. Examples of these elastomers are butyl (isobutylene-isoprene rubber or IIR), bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene copolymer or BIMSM), etc. The present application focuses on processability of halogenated isoolefin polymers, including BIMSM.

It is known to form conventional and nanocomposite tire innerliners using brominated copolymers of isobutylene and para-methylstyrene, and blends of these copolymers with other polymers. See, for example, Elspass et al., U.S. Pat. Nos. 5,807,629, and 6,034,164. Conventional tire innerliners are typically filled with carbon black or another filler, whereas nanocomposites typically can also include clay.

Carbon black is a conventional reinforcing material used in halogenated isoolefin rubbers. The major carbon black used in tire innerliners is N660, which has a nitrogen surface area of 35 $m^2/g$. W. Barbin et al., Chapter 9 in *Science and Technology of Rubber*, J. E. Mark et al. Eds., 2nd Ed., Academic Press: New York, (1994). N234 is another common carbon black, which has a nitrogen surface area of 126 $m^2/g$ and greater reinforcing characteristics. The tack behavior of butyl polymer containing a small amount of tackifier is known from, for example, M. F. Tse, "Green Tack of Butyl Polymers", *Polym. Prepr.*, vol. 45, no. 1, p. 980 (2004).

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays." Due to the general enhancement in air barrier qualities of various polymer blends when clays are present, there is a desire for a nanocomposite with low air permeability; especially a dynamically vulcanized elastomer nanocomposite such as used in the manufacture of tires.

Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874. Elastomeric nanocomposite innerliners and innertubes have also been formed using a complexing agent and a rubber, where the agent is a reactive rubber having positively charged groups and a layered silicate uniformly dispersed therein. See, for example, Kresge et al. U.S. Pat. Nos. 5,665,183 and 5,576,373.

Regardless of the filler employed, brominated copolymers of isobutylene and para-methylstyrene, and blends thereof used in tire innerliners, would desirably have a processability similar to that of conventional bromobutyl rubber, especially when filled with various levels of carbon black, clay particles, or the like. When a polymer is deformed, a stress builds up in the polymer due to a decrease in entropy. However, even if the polymer is kept in the strained state, the stress will drop or relax because the polymer chains tend to diffuse back to the isotropic state of highest thermodynamic probability. Good processability requires fast stress relaxation of the green or uncured composition when strained to a prescribed deformation. Therefore, as used herein, the terminology of processability and stress relaxation is used synonymously. Poor processability or a slow stress decay or relaxation poses problems in tire building because no operator wants to handle a piece of rubber compound that continues to shrink as time goes on. Although this application has existed for many decades, there are not many systematic studies on the processability of green elastomers loaded with carbon black or other fillers. Usually, the concentration of carbon black ranges from 40-100 phr, where phr stands for parts per hundred of rubber (if elastomer=100 g, then carbon black=40-100 g). Of course, besides processability, it is desired to maintain other elastomer innerliner compound performance advantages as much as possible, such as impermeability, flex fatigue resistance, cured adhesion, etc.

At low carbon black loading in a butyl rubber, the composite can be described as showing a liquid-like behavior. With increasing carbon black loading in many butyl rubbers, a gel-like behavior can occur when the filler has a high enough concentration and/or the polymer has strong enough interactions with the filler so that the filler particles begin to percolate through the polymer to form a continuous network. The carbon black or other filler loading concentration at which gel-like or pseudo-solid-like behavior occurs is referred to as the percolation threshold.

Usually, lower critical filler concentrations or percolation thresholds are the result of stronger polymer/filler interactions, as described in Y. Yurekli et al., "Structure and Dynamics of Carbon Black-Filled Elastomers," *J. Polym. Sci., Polym. Phys. Ed.*, vol. 39, p. 256 (2001); and M. F. Tse et al., "Structure and Dynamics of Carbon Black Filled Elastomers II, IMS and IR," *Rubber World*, vol. 228, no. 1, p. 30 (2003). With increasing filler loadings, the percolation threshold can manifest itself in various ways, for example: a sharp increase in relaxation time; a sharp increase in the area under the stress relaxation curve, referred to as the steady state viscosity (see Strobl, *The Physics of Polymers,* 2nd Ed., Springer, Germany (1997) (a faster relaxation will result in a smaller area, hence, a lower steady state viscosity or an improvement in processability); an increase in storage modulus (G') in the low frequency region to a similar magnitude as the loss modulus (G"); etc. In any case, it is observed that processability declines significantly when the loading exceeds the percolation threshold. An explanation of stress relaxation of a polymer is given in W. Tobolsky, *Properties and Structure of Polymers,* John Wiley & Sons, Inc., New York, N.Y., p. 219 (1960).

The improvement of processability of rubber compounds based on star-branched butyl and halobutyl polymers is known, for example, from Powers et al., U.S. Pat. No. 5,071, 913. Unique polymerization conditions enable broadening of the molecular weight distribution via a high degree of branching so that the polymer consists of low molecular weight linear chains that are blended with a small fraction of star-shaped molecules. Processability benefits include faster stress relaxation, enhanced green strength, and improved mixing, calendering and extrusion.

The present invention discloses halogenated isoolefin elastomers filled with carbon black or another filler, having a molecular weight and composition for fast large strain induced stress relaxation of the green rubber compounds, and improved small-strain viscoelastic properties, which determine at what concentration the filler begins to percolate and form a continuous network. It has quite surprisingly been found that, when filled with carbon black, clay or another filler, halogenated isoolefin elastomers, such as, for example, brominated isobutylene-para-methylstyrene elastomers having specified characteristics of alkylstyrene content, bromine content, Mooney viscosity, molecular weight, and branching index, have a similar degree of stress relaxation compared to conventional bromobutyl rubbers.

SUMMARY OF THE INVENTION

It has been found that for good processability in the filled, green compound, halogenated isoolefin elastomers should have specific Mooney viscosity, molecular weight, and branching index characteristics. The use of such an elastomer provides improved melt properties and processability characteristics of the filled composition, such as viscosity, relaxation characteristics, green strength, and other physical properties. Improvements in permeability can also be realized. Many physical properties of end use products formed with these elastomers can be comparable to those of nanocomposites or other filled compositions formed with conventional elastomers such as bromobutyl rubbers (brominated isobutylene-isoprene rubber or BIIR). For example, the composition of the invention can be used as an air barrier, such as in innerliners and innertubes.

The present invention provides, in one embodiment, new brominated isobutylene-methylstyrene (EXXPRO (BIMSM)) elastomer grades specifically designed for nanocomposite innerliners with enhanced barrier properties to meet tire manufacturing needs. One key requirement in this application is green compound processability of EXXPRO elastomer similar to a bromobutyl rubber such as BIIR 2222. For good processability, fast stress relaxation of the green compound when strained to a prescribed deformation is required. Based on large-strain non-linear viscoelastic studies (strain=100%), it has surprisingly been found that a EXXPRO (BIMSM) elastomer with a similar Mooney viscosity or molecular weight as bromobutyl BIIR 2222 can have a similar degree of stress relaxation as the latter polymer when the same amount of N660 is present in the two polymers. Based on small-strain linear viscoelastic studies (strain=1-2%), it has been found that EXXPRO elastomers with different molecular weights and compositions exhibit a similar degree of interaction with N660 based on the concept of percolation threshold.

Overall, the BIMSM/N660 interactions do not appear to be strong. Although not wishing to be bound by theory, it is believed that, for a lower reinforcing carbon black such as N660 with the EXXPRO (BIMSM) elastomer, a large strain of 100% in the processability measurements will de-wet or de-bond the polymer chains from the filler surface. This is known as the Payne effect. Another description of the Payne effect is that a large strain will be able to break down the filler agglomerate network and release the trapped polymer chains. Stress relaxation thus depends predominantly on the molecular weight or Mooney viscosity of the polymer. A slight improvement in processability can also be achieved by further reducing polymer/filler interactions, which can be effected by lowering the functionality on the carbon black and/or in the polymer. Overall, however, it appears that BIMSM Mooney viscosity or molecular weight is more important than BIMSM/filler interactions in controlling processability. The present invention thus provides a halogenated isoolefin elastomer such as EXXPRO (BIMSM) with suitable properties for use as the base polymer in innerliner formulations.

In one embodiment, the present invention provides an elastomeric composition processable in a curable, filled rubber formulation. The composition includes a halogenated interpolymer of a $C_4$ to $C_7$ isoolefin and from 3 to 20 weight percent (wt %) alkylstyrene. The interpolymer comprises from 0.2 to 2 mole percent (mol %) haloalkylstyrene. The interpolymer has a Mooney viscosity less than 37, a number average molecular weight less than 270,000, a weight average molecular weight less than 470,000, a z-average molecular weight less than 700,000, and a branching index (g') from 0.4 to 1.1. In one embodiment, the isoolefin is isobutylene, the alkylstyrene is p-methylstyrene and the halogen is bromine.

In one embodiment, the Mooney viscosity of the interpolymer is between 27 and 37, the number average molecular weight is between 170,000 and 270,000, the weight average molecular weight is between 300,000 and 470,000, and/or the z-average molecular weight is between 400,000 and 700,000; and in another embodiment the Mooney viscosity is between 28 and 34, the number average molecular weight is between 200,000 and 240,000, the weight average molecular weight is between 320,000 and 440,000, and/or the z-average molecular weight is between 450,000 and 650,000.

In one embodiment, the interpolymer comprises at least 70 mole percent isobutylene, from 5 to 10 weight percent p-methylstyrene, and from 0.5 to 1.5 mole percent bromomethylstyrene.

In other embodiments, the elastomeric composition has a characteristic time for stress relaxation to 1 kPa less than 300 seconds, and/or the elastomeric composition has a characteristic steady state viscosity less than 2000 kPa·s.

The elastomeric composition can further include a secondary rubber, processing aid, curative, antidegradant, filler, softener, or the like, or a combination thereof. In one embodiment, the elastomeric composition includes from 20 to 70 phr carbon black, from 1 to 30 phr clay in another embodiment, and a combination of from 20 to 70 phr carbon black and from 1 to 30 phr clay in a further embodiment.

In another aspect, the present invention provides a method of making a cured, filled rubber article. The method includes: (a) compounding an elastomeric composition with filler and curative, wherein the elastomeric composition is described above; (b) processing the compounded composition to form a shape of the article; and (c) curing the composition to obtain the article in the formed shape. The article can be an innerliner or an innertube, for example.

In another embodiment, the invention provides a tire comprising an innerliner made by the method of: (a) compounding the elastomeric composition described above with filler and curative, e.g. wherein the elastomeric composition comprises a brominated interpolymer of isobutylene and from 3 to 20 weight percent p-methylstyrene and comprising from 0.2 to 2 mole percent bromomethylstyrene, a Mooney viscosity less than 37, a number average molecular weight less than 270,000, a weight average molecular weight less than 470,000, a z-average molecular weight less than 700,000, and a branching index (g') from 0.4 to 1.1; (b) processing the compounded composition to form an innerliner shape in a tire; and (c) curing the composition to form the innerliner in the tire.

In one embodiment, the tire innerliner can have an air permeability less than $3.5 \times 10^{-8}$ $cm^3$-cm/$cm^2$-s-atm, and in other embodiments, from $1.2 \times 10^{-8}$ to $4 \times 10^{-8}$ $cm^3$-cm/$cm^2$-sec-atm, or from $1.5 \times 10^{-8}$ to $3.5 \times 10^{-8}$ $cm^3$-cm/$cm^2$-sec-atm. In other embodiments, the tire has a characteristic inflation pressure retention of less than 2.25 percent loss per month, preferably less than 2 percent loss per month, and/or a characteristic tire durability of at least 700 hours, preferably at least 750 hours, and more preferably at least 800 hours.

DETAILED DESCRIPTION

Figure 1:
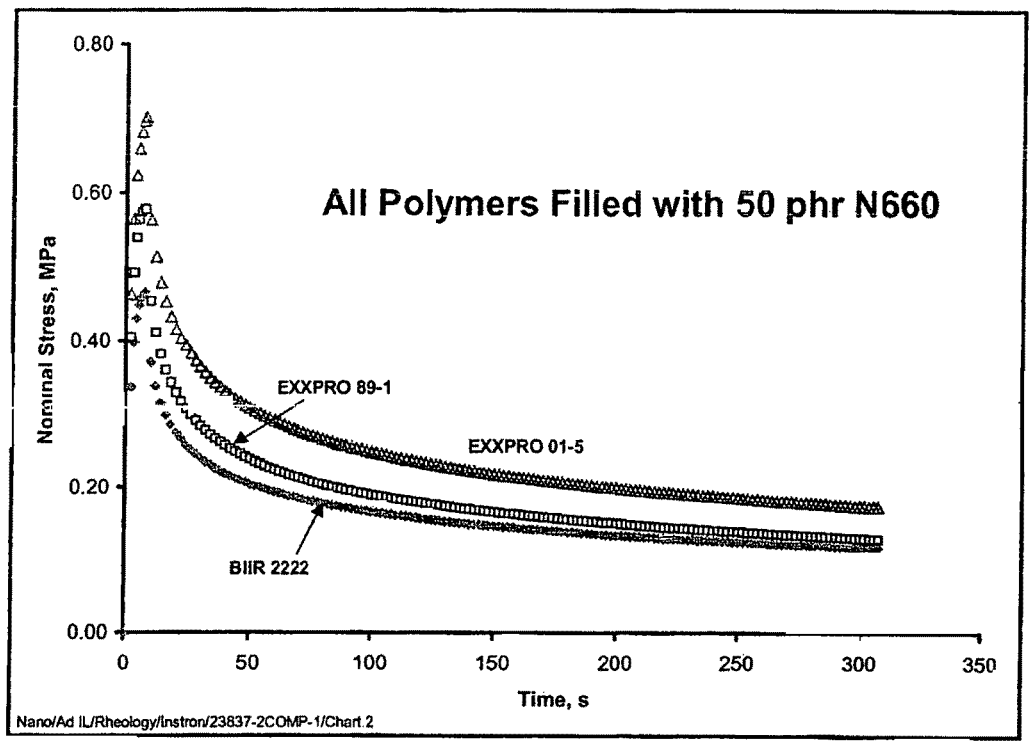
FIG. 1 is a graph of stress relaxation in tensile mode for BIIR 2222, EXXPRO 89-1 and EXXPRO 01-5 filled with 50 phr carbon black N660.

This invention describes an uncured, filled elastomer composition with processability, a process for making a useful article from the composition, and the useful articles so made. The composition or article in one embodiment is a nanocomposite of a halogenated elastomer and a clay also including carbon black as a reinforcing filler, suitable for use as an air barrier, e.g. as an innerliner or innertube.

Definitions

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, the "chain branching index" or g is defined as according to the IUPAC Commission on Macromolecular Nomenclature, i.e. as the ratio of the mean-square radius of gyration of a branched molecule to that of an otherwise identical linear molecule with the same relative molecular mass in the same solvent and at the same temperature.

Other polymer science terms not specifically defined herein shall be defined in accordance with the definitions published by the IUPAC Commission on Macromolecular Nomenclature.

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mole percent repeat units from isobutylene.

As used herein, "isoolefin" refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing heteroatoms as discussed in more detail below.

Elastomer

The composition of the present invention includes an elastomer comprising $C_4$ to $C_7$ isoolefin derived units. The elastomer can be halogenated. The isoolefin may be a $C_4$ to $C_7$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene.

The elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and can also include functionalized interpolymers wherein at least some of the alkyl substituent groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

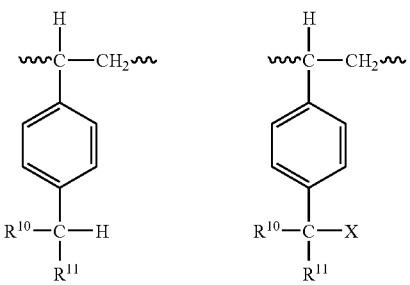

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be a functionalized structure in one embodiment, and in another embodiment from 0.1 to 5 mole percent. In yet another embodiment, the amount of functionalized structure is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 or 30 weight percent para-methylstyrene, wherein up to 60 mole percent of the methyl substituent groups present on the benzyl ring contain a bromine or chlorine atom, preferably a bromine atom (para (bromomethylstyrene)), as well as a combination of para (bromomethylstyrene) and other functional groups such as ester and ether. These halogenated elastomers are commercially available as EXXPRO™ Elastomers (ExxonMobil Chemical Company, Houston Tex.), and abbreviated as "BIMSM." These elastomers can, if desired, have a substantially homogeneous compositional distribution such that at least 95% by weight of the polymer has a para-alkylstyrene content within 10% of the average para-alkylstyrene content of the polymer.

In one embodiment the EXXPRO (BIMSM) elastomer has a Mooney viscosity less than 37, and between 27 and 37, between 28 and 34, between 29 and 33, and between 30 and 32 in other embodiments. Desirable interpolymers can also be characterized by a narrow molecular weight distribution ($M_w/M_n$) of less than 5, more preferably less than 2.5.

The interpolymers can also be characterized by a preferred viscosity average molecular weight in the range of from 2,000 up to 2,000,000 and a preferred number average molecular weight in the range of from 2500 to 750,000 as determined by gel permeation chromatography. In particular embodiments it may be preferable to utilize two or more interpolymers having a similar backbone, such as a low molecular weight interpolymer having a weight average molecular weight less than 150,000 can be blended with a high molecular weight interpolymer having a weight average molecular weight greater than 250,000, for example.

The BIMSM polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMSM polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; other poly(isobutylene-co-p-methylstyrene) and halogenated poly(isobutylene-co-p-methylstyrene) elastomers, such as, for example, terpolymers of isobutylene derived units, p-methylstyrene derived units, and p-bromomethylstyrene derived units that have monomer contents, molecular weights, Mooney viscosities, chain branching indices or other properties not meeting the above BIMSM specifications, and mixtures thereof.

A desirable embodiment of the secondary rubber component present is natural rubber. Natural rubbers are described in detail by Subramaniam in RUBBER TECHNOLOGY 179-208 (M. Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (R. F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by E. Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

The halogenated elastomer useful as the secondary rubber in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (R. F. Obm ed., R.T. Vanderbilt Co., Inc. 1990), and in RUBBER TECHNOLOGY 311-321 (M. Morton ed., Chapman & Hall 1995). Butyl rubbers, halogenated butyl rubbers, and star-branched butyl rubbers are described by E. Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_7$ isoolefin monomer component such as isobutylene with (2) a multiolefin, or conjugated diene, monomer component. The isoolefin is in a range from 70 to 99.5 weight percent by weight of the total comonomer mixture in one embodiment, and 85 to 99.5 weight percent in another embodiment. The conjugated diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is conjugated diene.

The isoolefin is a $C_4$ to $C_7$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 weight percent of isobutylene with 0.5 to 8 weight percent isoprene, or reacting 95 to 99.5 weight percent isobutylene with from 0.5 to 5.0 weight percent isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney viscosity of from 20 to 70 (ML 1+8 at 125° C.) in one embodiment, and from 25 to 55 in another embodiment. The halogen content is from 0.1 to 10 weight percent based in on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated butyl or star-branched butyl rubber used as the secondary rubber component may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963, 4,649,178, and 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

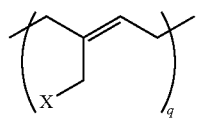

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber used as the secondary rubber component of the present invention is Bromobutyl 2222 (ExxonMobil Chemical Company). Its Mooney viscosity is from 27 to 37 (ML 1+8 at 125° C., ASTM 1646, modified), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber used as the secondary rubber component is Bromobutyl 2255 (ExxonMobil Chemical Company). Its Mooney viscosity is from 41 to 51 (ML 1+8 at 125° C., ASTM 1646, modified), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

In another embodiment of the brominated rubber used as the secondary rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR used as the secondary rubber component is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer weight percent, greater than 0.3 weight percent in one embodiment, and from 0.3 to 3 weight percent in another embodiment, and from 0.4 to 2.7 weight percent in yet another embodiment.

A commercial embodiment of the SBHR used as the secondary rubber component of the present invention is Bromobutyl 6222 (ExxonMobil Chemical Company), having a Mooney viscosity (ML 1+8 at 125° C., ASTM 1646, modified) of from 27 to 37, and a bromine content of from 2.2 to 2.6 weight percent relative to the SBHR. Further, cure characteristics of Bromobutyl 6222 are as follows: MH is from 24 to 38 dN·m, ML is from 6 to 16 dN·m (ASTM D2084, modified).

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range up to 90 phr in one embodiment, up to 50 phr in another embodiment, up to 40 phr in another embodiment, up to 30 phr in another embodiment, and up to 20 phr in yet another embodiment. In yet another embodiment, the secondary rubber is present from at least 2 phr, from at least 5 phr in another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, from 10 to 80 phr in another embodiment, from 30 to 70 phr in yet another embodiment, from 40 to 60 phr in yet another embodiment, from 5 to 50 phr in yet another embodiment, from 5 to 30 phr in yet another embodiment, from 2 to 20 phr in another embodiment, from 5 to 20 phr in another embodiment, from 20 to 60 phr in yet another embodiment, and from 20 to 50 phr in yet another embodiment, the chosen embodiment depending upon the desired end use application of the composition.

Fillers, Curatives and other Additives

The composition of the invention may also include one or more filler components such as calcium carbonate, clay, mica, silica and silicates, talc, titanium dioxide, and carbon black. As used herein, fillers can include inorganic clay and/or organoclay particles forming part of the nanocomposite matrix, e.g. clay particles having a dimension in the nanometer range, as well as larger clay particles that can be used as a filler by itself or with smaller clay particles in the nanocomposites, if desired. In one embodiment, the filler is carbon black or modified carbon black. The preferred filler is semi-reinforcing grade carbon black present at a level of from 10 to 150 phr of the blend, more preferably from 30 to 120 phr, and especially from 35 to 100 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes. Other useful goods that can be made using compositions of the invention include hoses, seals, molded goods, cable housing, and other articles disclosed in THE VANDERBILT RUBBER HANDBOOK, p 637-772 (R. F. Ohm, ed., R.T. Vanderbilt Company, Inc. 1990).

Clays

The nanocomposites of the present invention can include swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 weight percent; between 0.1 and 3.0 weight percent in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N-R^{20}-NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure $-Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, and 4,889,885 as well as WO92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula $Z-R^{17}-Z'$, wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (D. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, and from 5 to 20 phr in another embodiment.

Nanocomposite Processing

Elastomer—clay nanocomposites can be formed using a variety of processes, such as solution blending, melt blending, or an emulsion process. For example, in commonly assigned U.S. application Ser. No. 11,184,000 for Functionalized Isobutylene Polymer-Inorganic Clay Nanocomposites and Organic-Aqueous Emulsion Process by W. Weng et al., filed Jul. 18, 2005, there is disclosed a method for preparing clay-butyl rubber nanocomposites from an emulsion of rubber solution and aqueous clay dispersion in which the clay can be an inorganic clay. As another example of nanocomposite processing, in commonly assigned U.S. application Ser. No. 11/183,361 for Split-Stream Process for Making Nanocomposites by W. Weng et al., also filed Jul. 18, 2005, there is disclosed a method for preparing clay-butyl rubber nanocomposites by preparing a concentrated nanocomposite from a slipstream of the rubber and blending the concentrate with a main rubber stream.

Melt Blending

The nanocomposite of the present invention can be formed by a polymer melt blending process, such as that described in PCT Application Ser. No. PCT/US/22714 for Polymeric Nanocomposites and Processes for Making the Same by W. Weng et al., filed Jun. 28, 2005, for example. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes

The nanocomposite of the present invention can also be formed by an emulsion processes. In one embodiment, the emulsion process can comprise mixing an aqueous slurry of inorganic clay with a polymer solution (cement). The mixing should be sufficiently vigorous to form emulsions or microemulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

The nanocomposite of the present invention can also be formed by solution blending. In certain embodiments, a nanocomposite is produced by a process comprising contacting Solution A comprising a solvent comprising a hydrocarbon and at least one layered filler or clay with Solution B comprising a solvent and at least one elastomer, and removing the solvents from the contact product of Solution A and Solution B to form a nanocomposite.

In the previous embodiments, the layered filler may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 weight percent, alternatively from 40 to 99 weight percent, alternatively from 50 to 99 weight percent, alternatively from 60 to 99 weight percent, alternatively from 70 to 99 weight percent, alternatively from 80 to 99 weight percent, alternatively from 90 to 99 weight percent, alternatively from 95 to 99 weight percent, based upon the total weight of the composition.

Additionally, in certain embodiments, when two or more solvents are prepared in the production of the nanocomposite composition, each solvent may comprise from 0.1 to 99.9 volume percent, alternatively from 1 to 99 volume percent, alternatively from 5 to 95 volume percent, and alternatively from 10 to 90 volume percent, with the total volume of all solvents present at 100 volume percent.

Nanocomposite Properties

In another embodiment, a nanocomposite formed from an above described process to improve the air impermeability of an elastomer has an oxygen transmission rate of 160 mm·cc/[m²·day] at 40° C. or lower as measured on cured nanocomposite compositions or articles as described herein.

Alternatively, the oxygen transmission rate is 150 mm·cc/[m²·day] at 40° C. or lower as measured on cured nanocomposite compounds as described herein; the oxygen transmission rate is 140 mm·cc/[m²·day] at 40° C. or lower as measured on cured nanocomposite compounds as described herein; the oxygen transmission rate is 130 mm·cc/[m²·day] at 40° C. or lower as measured on cured nanocomposite compounds as described herein; the oxygen transmission rate is 120 mm·cc/[m2·day] at 40° C. or lower as measured on cured nanocomposite compounds as described herein; the oxygen transmission rate is 110 mm·cc/[m²·day] at 40° C. or lower as measured on cured nanocomposite compounds as described herein; the oxygen transmission rate is 100 mm·cc/[m²·day] at 40° C. or lower as measured on cured nanocomposite compounds as described herein; the oxygen transmission rate is 90 mm·cc/[m²·day] at 40° C. or lower as measured on cured nanocomposite compounds as described herein; the oxygen transmission rate is 80 mm·cc/[m²·day] at 40° C. or lower as measured on cured nanocomposite compounds as described herein; or, the oxygen transmission rate is 70 mm·cc/[m²·day] at 40° C. or lower as measured on cured nanocomposite compounds as described herein.

EXAMPLES

BIMSM/Carbon Black Formulations

Table 1 describes the elastomers used in these examples. All numbers in this table represent only approximate values. X1 [XP 3433*] is an embodiment of the inventive elastomer, and is a EXXPRO (BIMSM) elastomer with a Mooney viscosity [ML (1+8) 125° C.] of 31, chain branching index (g')=0.94, 1.0 mole percent bromo-p-methylstyrene (BrPMS), and 8 weight percent p-methylstyrene (PMS). X2 [EXXPRO 03-1] used in some examples below is similar, but contains 0.85 mole percent BrPMS and 10 weight percent PMS. CX1 is BIIR 2222, a low Mooney viscosity polymer, included for the purpose of comparison. CX2, CX3, and CX4 are various EXXPRO (BIMSM) elastomers, included for the purpose of comparison, and CX2BB, CX3BB, and CX4BB are the corresponding backbone polymers (not halogenated), also provided for the purpose of comparison. Mooney viscosity in these comparative elastomers varies from 31 to 45, BrPMS from 0.75 to 1.2 mole percent and PMS from 5 to 10 weight percent.

TABLE 1

Characterization of Elastomers

| Elastomer - Commercial Designation | Mooney Viscosity [ML (1 + 8) 125° C.] | Mn kg/mol | Mw kg/mol | Mz kg/mol | g' [Dimensionless] | BrPMS Mol % | PMS Wt % |
|---|---|---|---|---|---|---|---|
| CX1 - BIIR 2222 | 32 | 240 | 660 | 1590 | 0.86 | 2.0** | 0 |
| CX2 - EXXPRO 01-5 | 44 | 300 | 500 | 740 | 0.93 | 0.85 | 10 |
| CX2BB - EXXPRO 01-5 BB*** | 44 | 300 | 490 | 700 | 0.95 | 0 | 10 |
| CX3 - EXXPRO 89-1 | 37 | 240 | 400 | 610 | 0.97 | 0.75 | 5 |
| CX3BB - EXXPRO 89-1 BB*** | 37 | 270 | 470 | 700 | 0.99 | 0 | 5 |
| CX4 - EXXPRO 90-10 | 45 | 280 | 490 | 720 | 0.96 | 1.2 | 7.5 |

TABLE 1-continued

Characterization of Elastomers

| Elastomer - Commercial Designation | Mooney Viscosity [ML (1 + 8) 125° C.] | Mn kg/mol | Mw kg/mol | Mz kg/mol | g' [Dimensionless] | BrPMS Mol % | PMS Wt % |
|---|---|---|---|---|---|---|---|
| CX4BB - EXXPRO 90-10 BB*** | 45 | 290 | 480 | 700 | 0.98 | 0 | 7.5 |
| X1 - EXXPRO XP 3433* | 31 | 220 | 380 | 550 | 0.94 | 1.0 | 8 |
| X2 - EXXPRO 03-1 | 31 | 220 | 380 | 550 | 0.94 | 0.85 | 10 |

**Wt % bromine
***Backbone, without bromine

The carbon blacks used were N660 (nitrogen surface area 35 m²/g, 97.94 atomic percentage (At %) carbon (as determined by X-ray photoelectron spectroscopy (XPS) analysis), 1.13 At % oxygen, 0.93 At % sulfur), pyrolyzed N660 (900° C. for 1 hour in nitrogen, 98.18 At % carbon, 0.90 At % oxygen, 0.92 At % sulfur), N234 (nitrogen surface area 126 m²/g), and AB50% from Chevron Phillips Chemical Company (nitrogen surface area 75 m²/g, 99.73 At % carbon, 0.26 At % oxygen, 0.01 At % sulfur).

Uncured rubber compounds with carbon black were prepared in a Banbury™ mixer. The mixing was started at about 65° C. and discharged after 3-5 minutes at about 150° C. Subsequent sheeting on a two-roll mill was performed to achieve a good dispersion of carbon black. The mixing and milling were repeated to ensure homogeneous mixing of the polymer and carbon black. Stress relaxation testing in tensile mode was performed at room temperature in an Instron Tensile Tester. Rectangular samples (dimension~12.7×50.8×2 mm) were strained to 100% at a speed of 50.8 cm/min and then kept in this strained state. The force exerted by each sample on the tensile tester was recorded for a time period of 5 minutes (300 s).

A Rubber Process Analyzer RPA 2000 (Alpha Technologies) was used to study the large-strain (i.e. non-linear) stress relaxation of the rubber compounds. The experiment was performed at 100° C., operated in the shear mode with an initial applied strain of 100%, using a procedure adopted from Michelin. During testing the sample was housed in a closed cavity with a serrated surface and maintained under pressure to avoid wall slippage of the rather stiff, filled rubbers. Duplicate or triplicate measurements were performed on each sample to insure the reporting of accurate data.

An ARES Dynamic Mechanical Analyzer (Rheometric Scientific) was used to study small-strain linear viscoelastic behavior. The highly sensitive transducer (0.2-200 g cm) was used to capture the melt data. The shear strain applied to the sample that was sandwiched between the 25-mm diameter parallel plates was either 1 or 2%. In this experiment, a sinusoidal strain (with an amplitude of $\gamma_o$ was applied to the sample and the output stress σ was measured. Due to the viscoelastic nature of polymers, σ consists of in-phase and out-of-phase components. The in-phase component is proportional to the storage modulus, G', whereas the out-of-phase component is proportional to the loss modulus, G", according to Equations 1 and 2, where ω and t are the frequency and the time, respectively, as follows:

$$\gamma(t) = \gamma_o \sin(\omega t) \quad (1)$$

$$\sigma(t) = \gamma_o [G' \sin(\omega t) + G'' \cos(\omega t)] \quad (2)$$

The stress relaxation in the case of elongational deformation for CX1 [BIIR 2222], CX2 [EXXPRO 01-5], and CX3 [EXXPRO 89-1] and each filled with 50 parts N660, is shown in FIG. 1. The experiment was performed at room temperature and the initial step-strain applied to the samples was 100%. The force or nominal stress exerted on the sample drops as time goes on. However, there is a larger amount of residual force or stress retained in CX2 [EXXPRO 01-5] versus CX3 [EXXPRO 89-1] and CX1 [BIIR 2222].

Figure 2A:
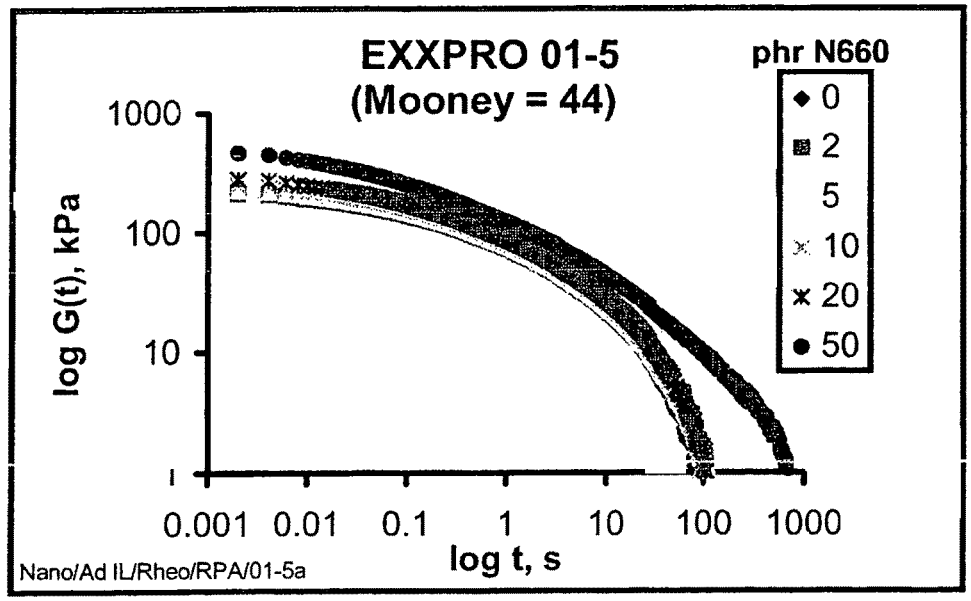
FIGS. 2A-2B show RPA curves of EXXPRO 01-5 (FIG. 2A) compared to BIIR 2222 (FIG. 2B).
Figure 2B:
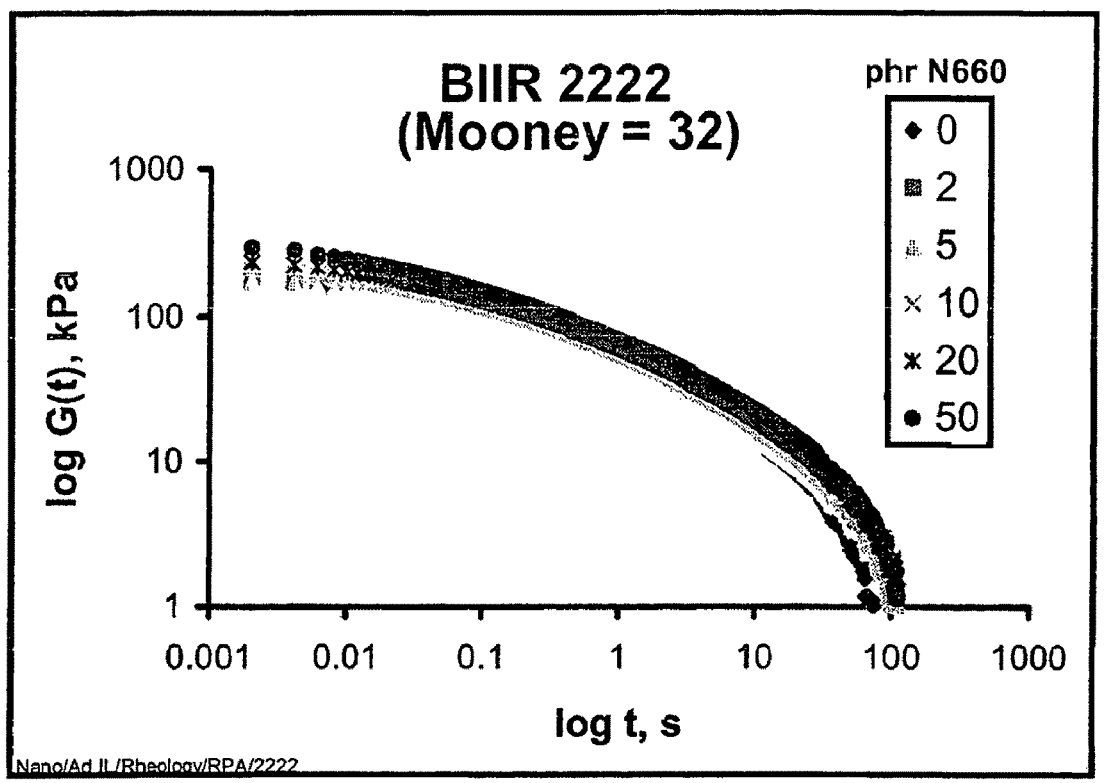
Figure 3A:
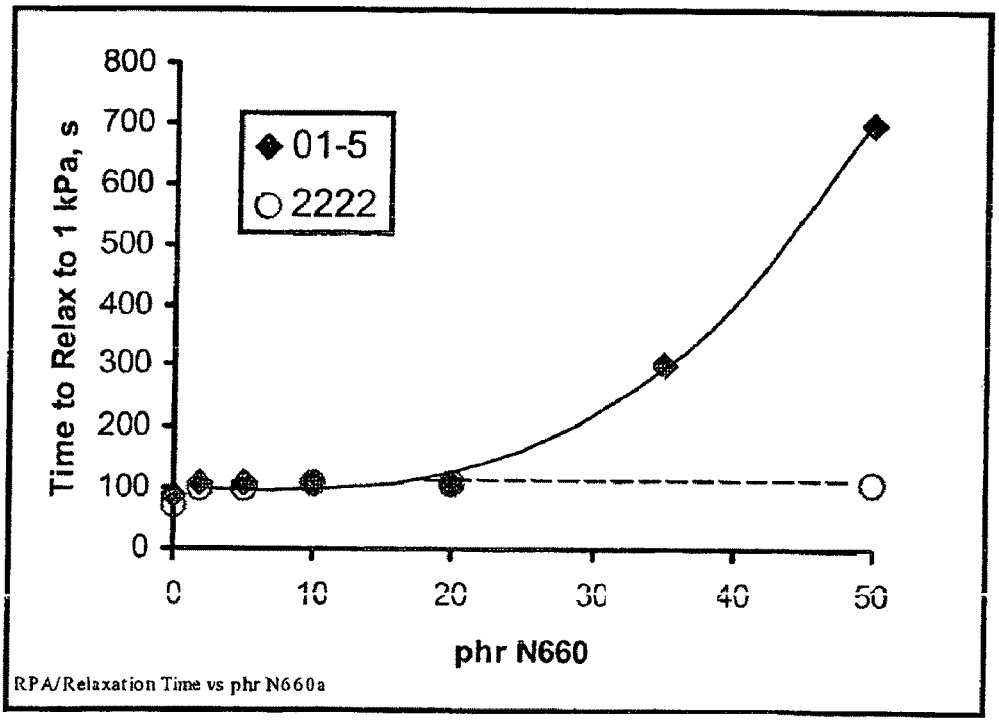
FIG. 3A shows stress relaxation time for BIIR 2222 and EXXPRO 01-5 as a function of carbon black N660) concentration.
Figure 3B:
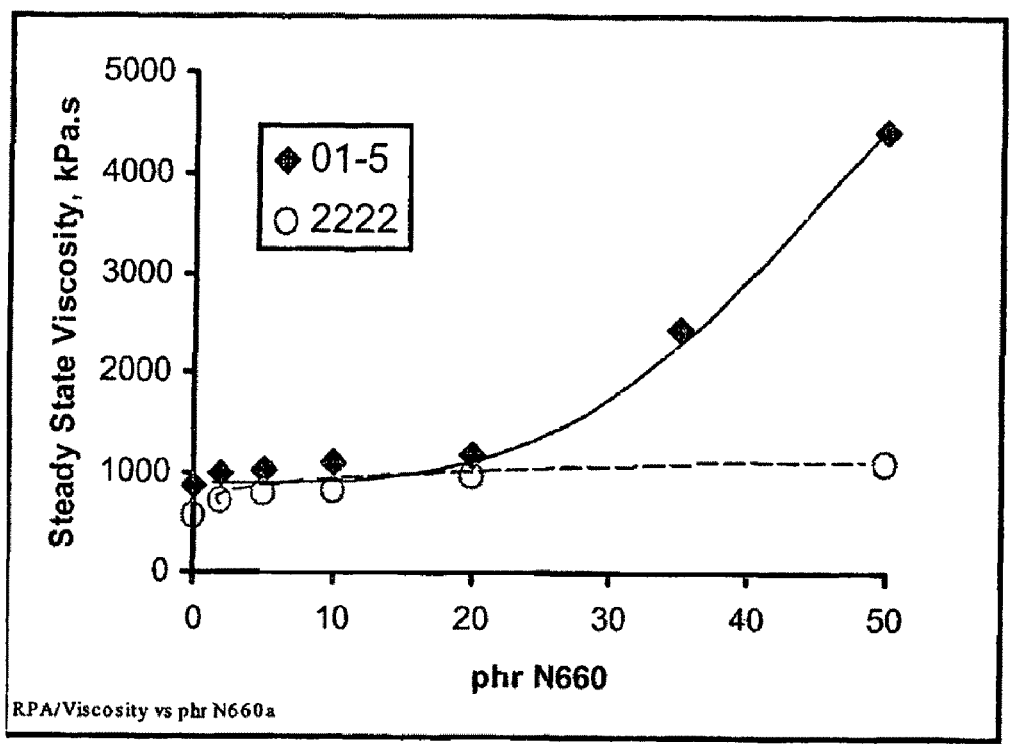
FIG. 3B shows steady state viscosity for BIIR 2222 and EXXPRO 01-5 as a function of carbon black (N660) concentration.

FIG. 2 shows RPA curves (log-log plots of the shear modulus, G, versus time, t) of CX2 [EXXPRO 01-5] compared to CX1 [BIIR 2222]. Each polymer was loaded with 0, 2, 5, 10, 20 and 50 parts of N660 carbon black. Overall, a higher carbon black content resulted in a longer time for the sample to relax. This is depicted more clearly in FIG. 3(a), in which the time to relax to 1 kPa (0.15 psi) was plotted as a function of the N660 loading for these two elastomers. The increase in this relaxation time was more pronounced for CX2 [EXXPRO 01-5] than CX1 [BIIR 2222] with increasing carbon black concentration. Similar behavior was observed for the viscosity, as shown by FIG. 3(b). For CX1 [BIIR 2222], the increase was gradual with increasing carbon black concentration. For CX2 [EXXPRO 01-5], the increase was more pronounced, especially at high levels of carbon black. These results suggest that the relaxation time and the steady state viscosity provide a means to discriminate the processability of filled and unfilled compounds.

Figure 4A:
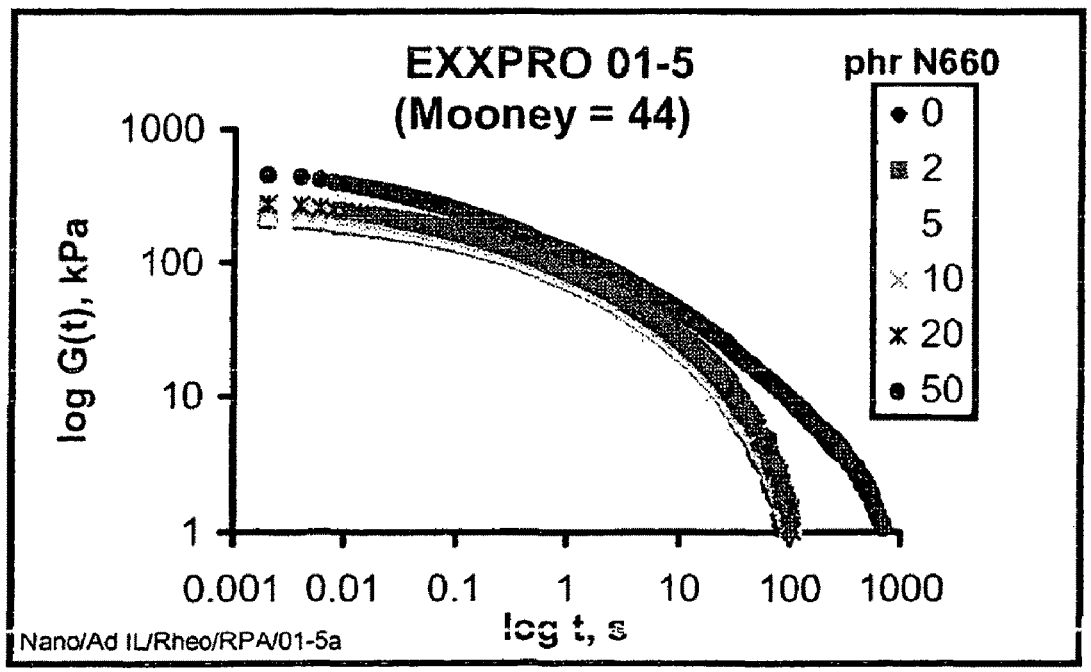
FIGS. 4A, 4B and 4C show processability at different carbon black loadings for EXXPRO 01-5 (FIG. 4A), EXXPRO 89-1 (FIG. 4B) and BIIR 2222 (FIG. 4C), and show EXXPRO 89-1 has a slightly increased rate of stress relaxation compared to EXXPRO 01-5.
Figure 4B:
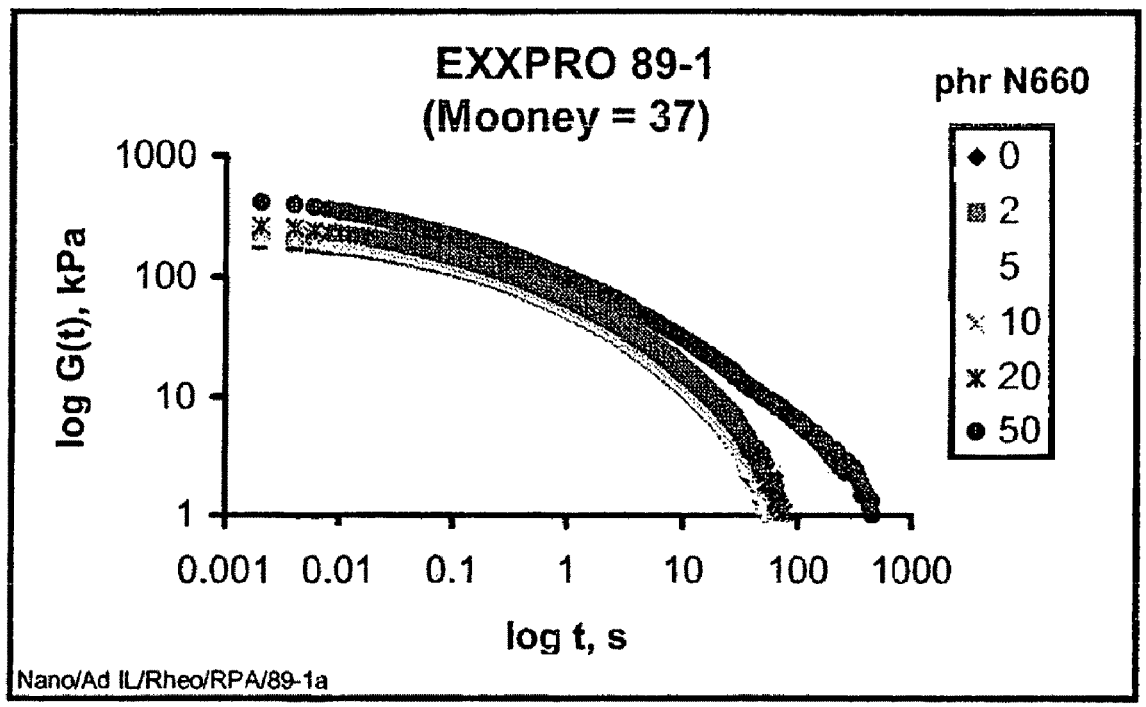
Figure 4C:
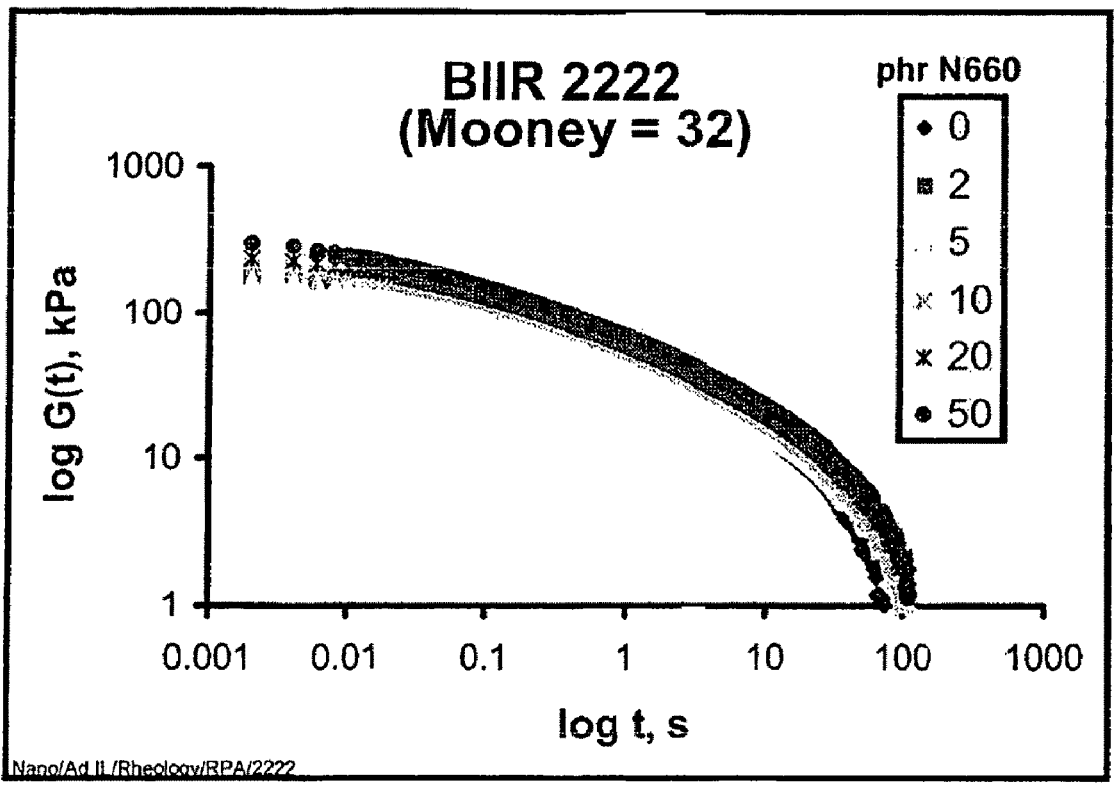

Because CX1 [BIIR 2222] had a lower Mooney viscosity than EXXPRO 01-5, we observed the changes from CX2 [EXXPRO 01-5] to CX3 [EXXPRO 89-1], which had a lower Mooney viscosity value (see Table 1). The time for the filled CX3 [EXXPRO 89-1] to relax was shorter than that for the filled CX2 [EXXPRO 01-5], as seen in FIG. 4; however, at 50 phr N660, it was still longer than that of CX1 [BIIR 2222]. These results are consistent with tensile stress relaxation data results in terms of the ranking by the time to relax that was presented in FIG. 1.

Figure 5A:
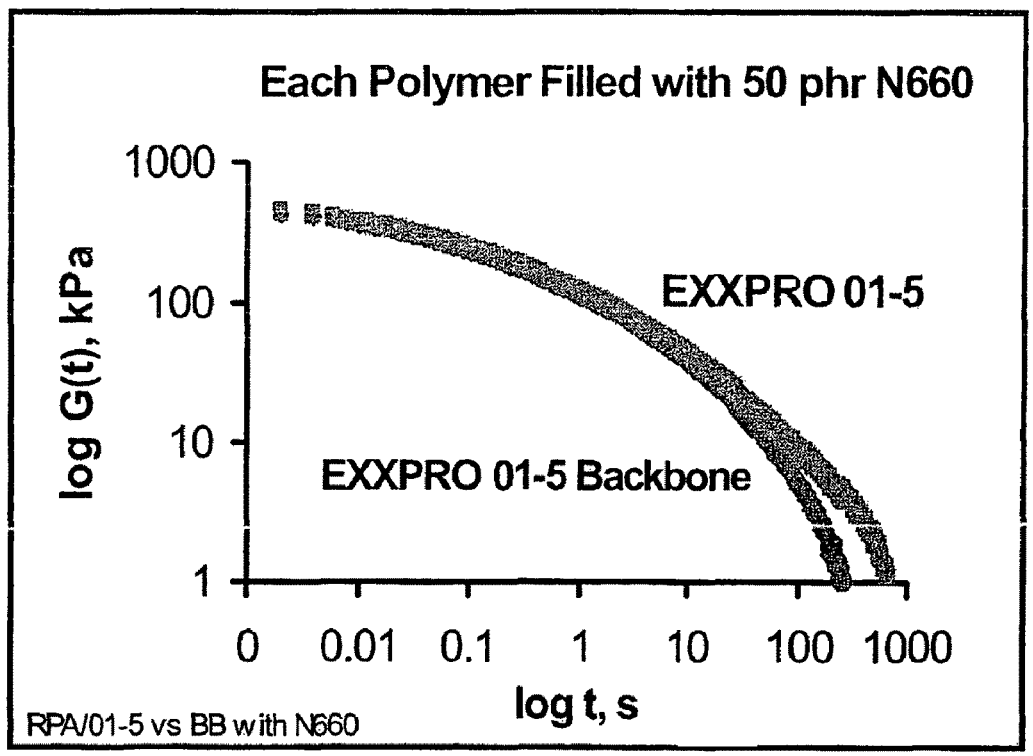
FIGS. 5A and 5B compare processability of EXXPRO 01-5 (FIG. 5A) and 90-10 (FIG. 5B) elastomers to their backbones.
Figure 5B:
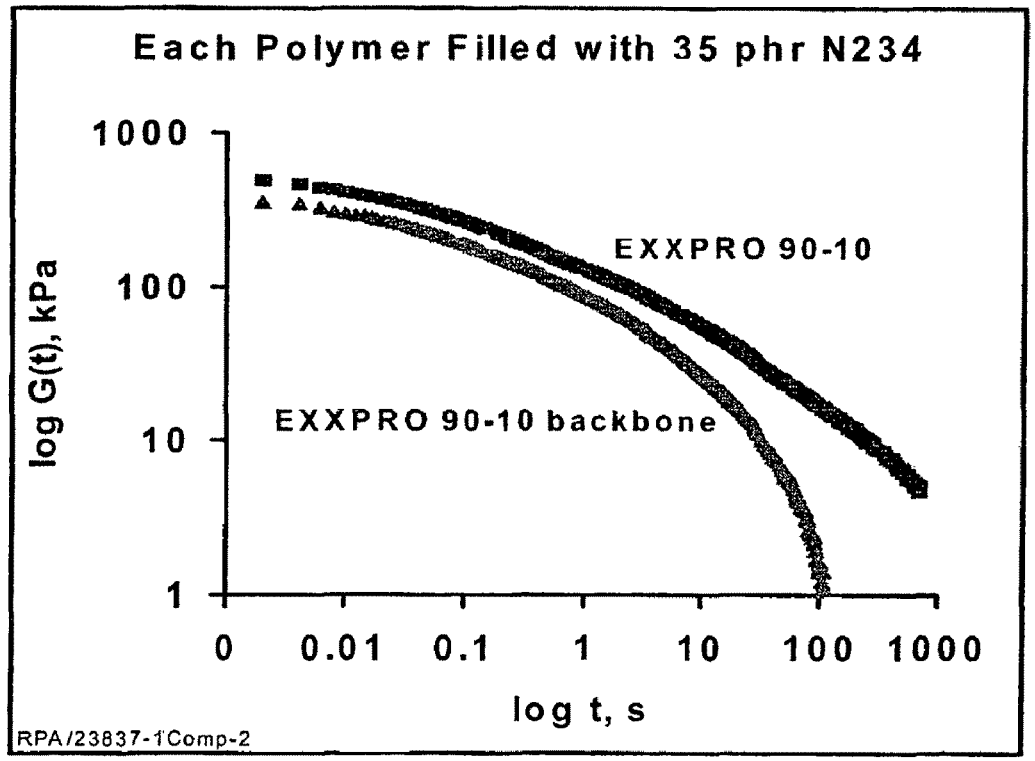

FIG. 5 demonstrates the effects of the BrPMS functional group in BIMSM elastomers and the type of carbon black filler on stress relaxation. Compared to the filled BIMSM elastomers, the filled backbone (filled unfunctionalized polymer) took a shorter time to relax to a low stress. However, the difference was greater for the high BrPMS CX4 [EXXPRO 90-10] filled with the highly reinforcing N234. N234 has a surface area that is 3-4 times higher than that for N660. On the other hand, for the lower BrPMS CX2 [EXXPRO 01-5] filled with the less reinforcing N660, the difference was not as significant. In other words, lowering the BrPMS level in CX2 [EXXPRO 01-5] would not improve its processability to a great extent.

Figure 6A:
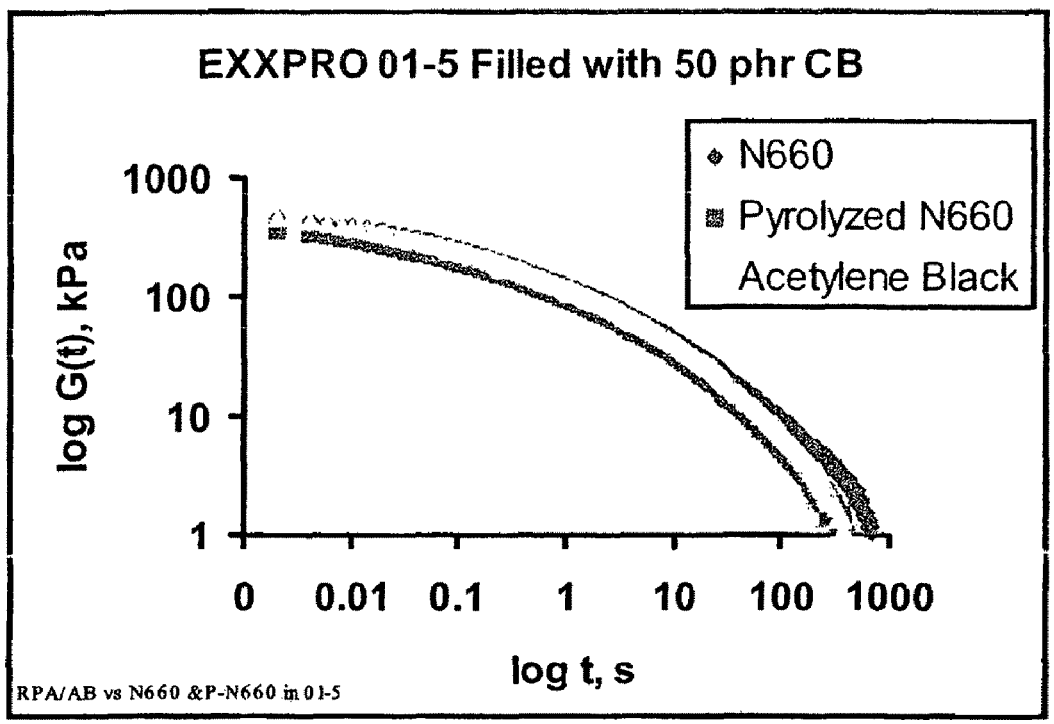
FIGS. 6A and 6B compare processability of EXXPRO 01-5 (FIG. 6A) and 89-1 (FIG. 6B) elastomers filled with 50 phr of different carbon blacks.
Figure 6B:
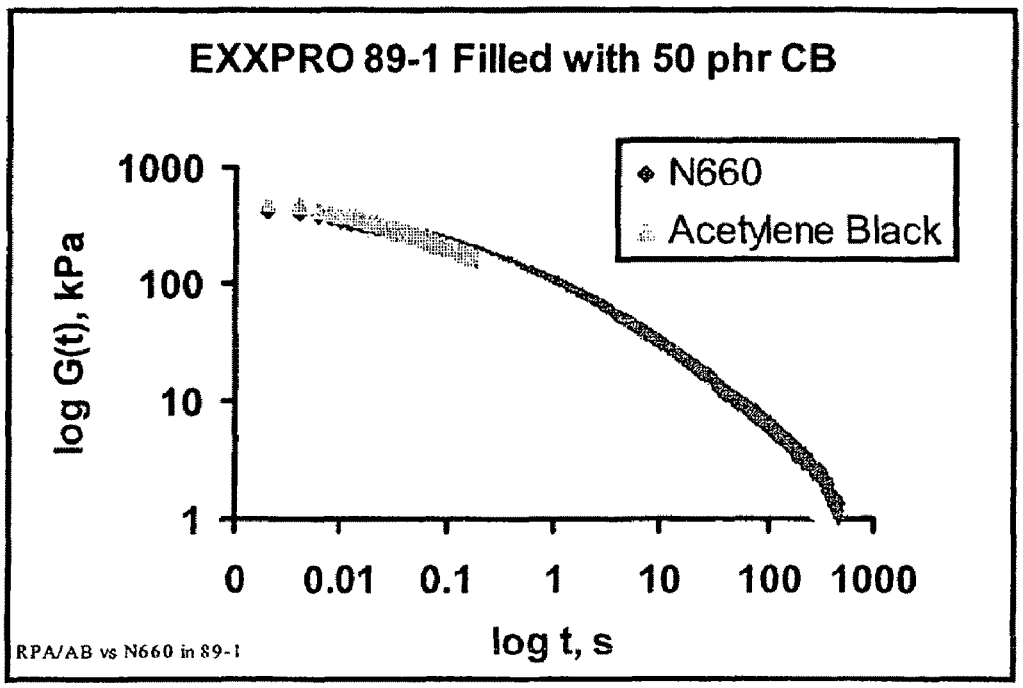

Additionally, decreasing the carbon black surface activity did not obtain much improvement either, as evidenced by the RPA curves of CX2 [EXXPRO 01-5] filled with 50 phr of carbon blacks with different surface activities shown in FIG. 6. N660 is desired for use in a nanocomposite innerliner. Pyrolyzed N660 was prepared by treating N660 at 900° C. for 1 hour in nitrogen. According to XPS analysis, there was a drop in oxygen atomic percentage (At %) in the pyrolyzed N660 compared to the original N660. An acetylene black with a low surface oxygen and a low sulfur atomic percentage was also used. When each of these low surface activity blacks was used in CX2 [EXXPRO 01-5], there was only a very slight improvement in processability. Similar behavior was also observed for CX3 [EXXPRO 89-1] when filled with 50 parts of N660 or acetylene black.

Figure 7A:
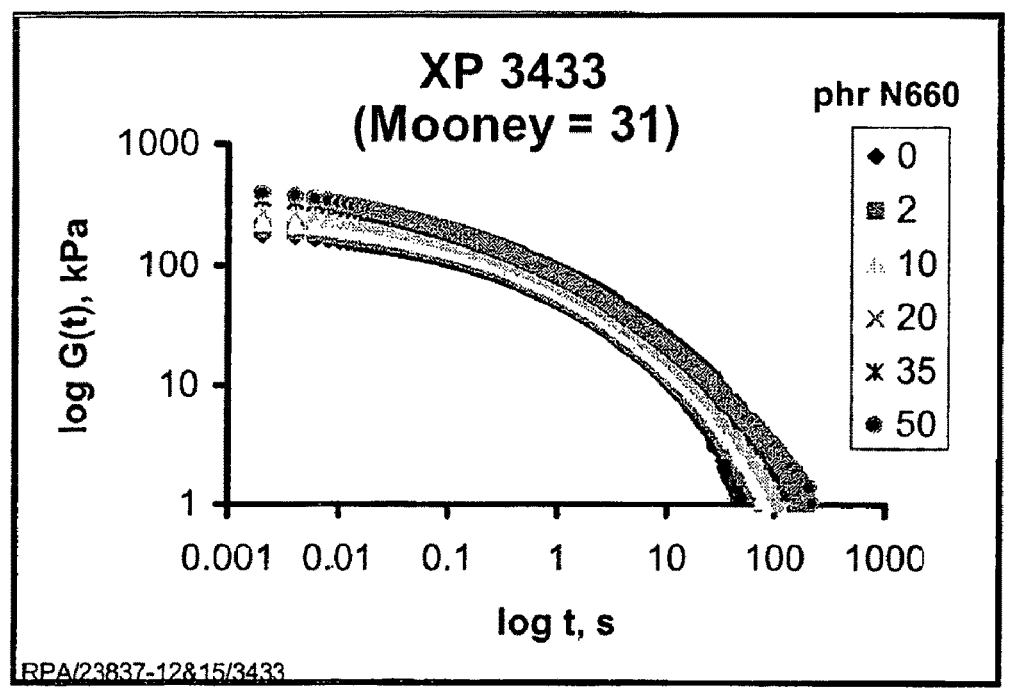
FIGS. 7A and 7B graphically compare the processability of a low Mooney viscosity or low molecular weight EXXPRO (FIG. 7A) to BIIR 2222 (FIG. 7B).
Figure 7B:
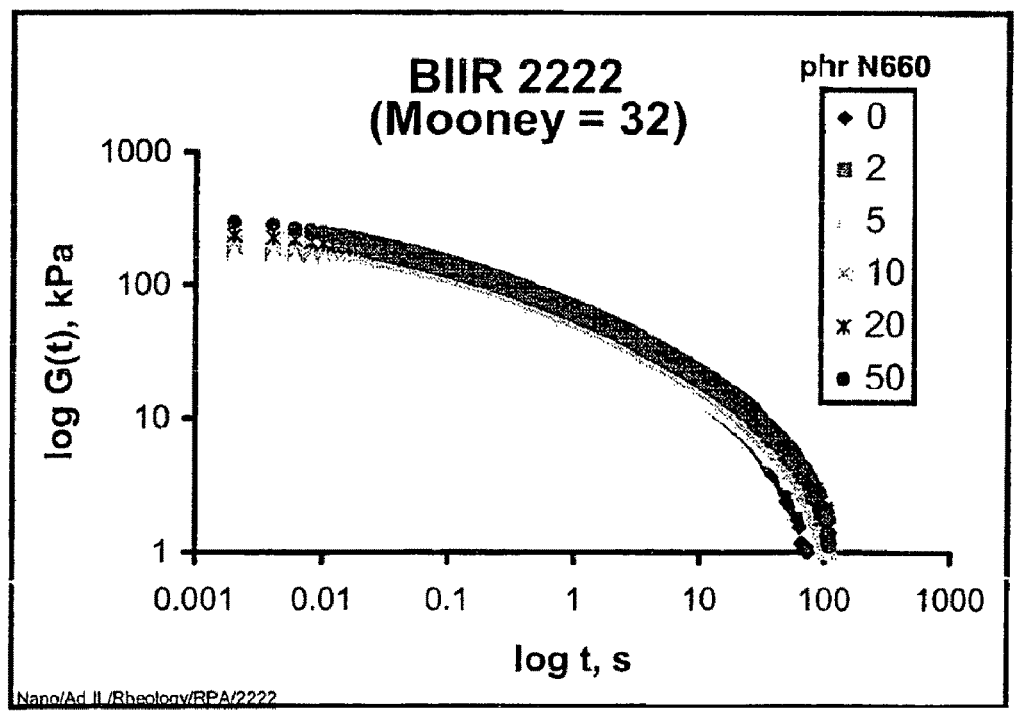

In contrast, with a BIMSM of lower molecular weight, a significant improvement in processability resulted, as shown by FIG. 7. X1 [EXXPRO elastomer, XP 3433*] was a BIMSM with a Mooney viscosity close to that of CX1 [BIIR 2222], and a faster stress relaxation similar to CX1 [BIIR 2222] was obtained at all N660 concentrations tested.

Figure 8A:
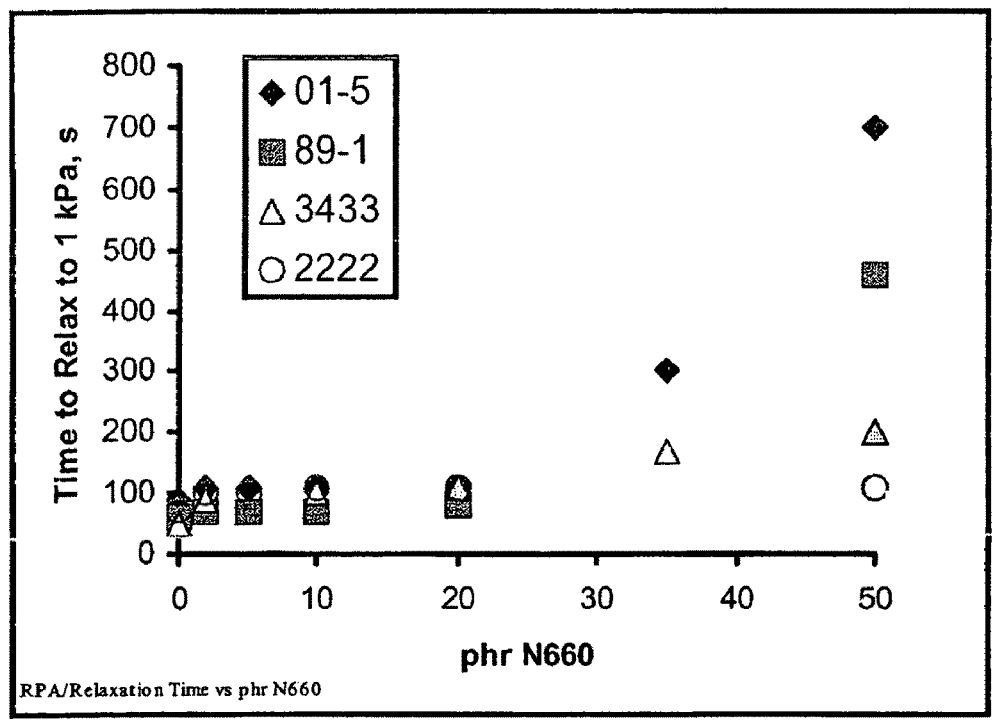
FIGS. 8A and 8B show the time to relax to a low stress (FIG. 8A) and steady state viscosity (FIG. 8B) for BIIR 2222 and EXXPRO polymers of varying Mooney viscosity at different N660 carbon black concentrations.
Figure 8B:
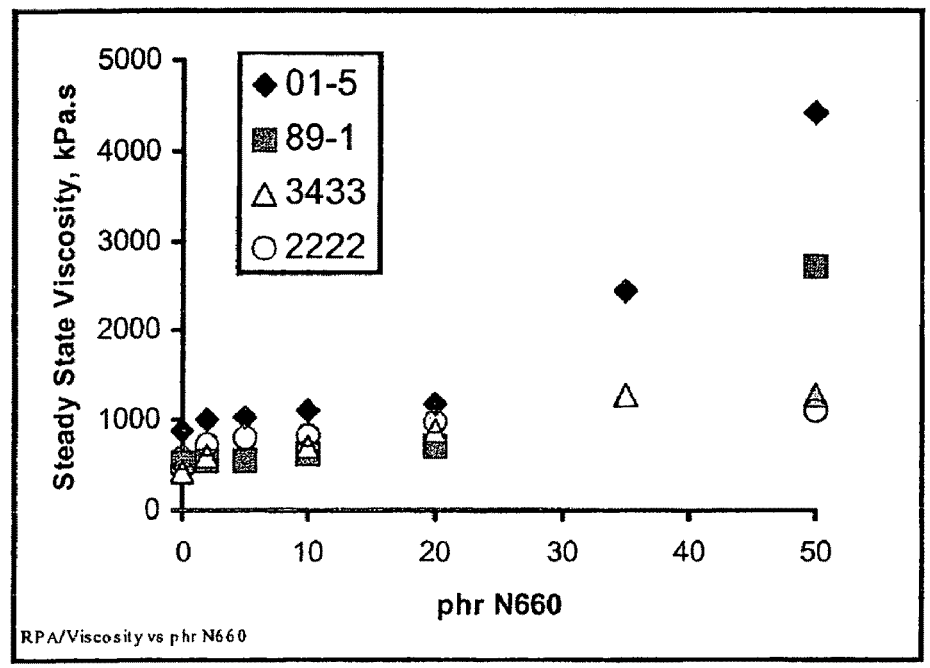
Figure 9A:
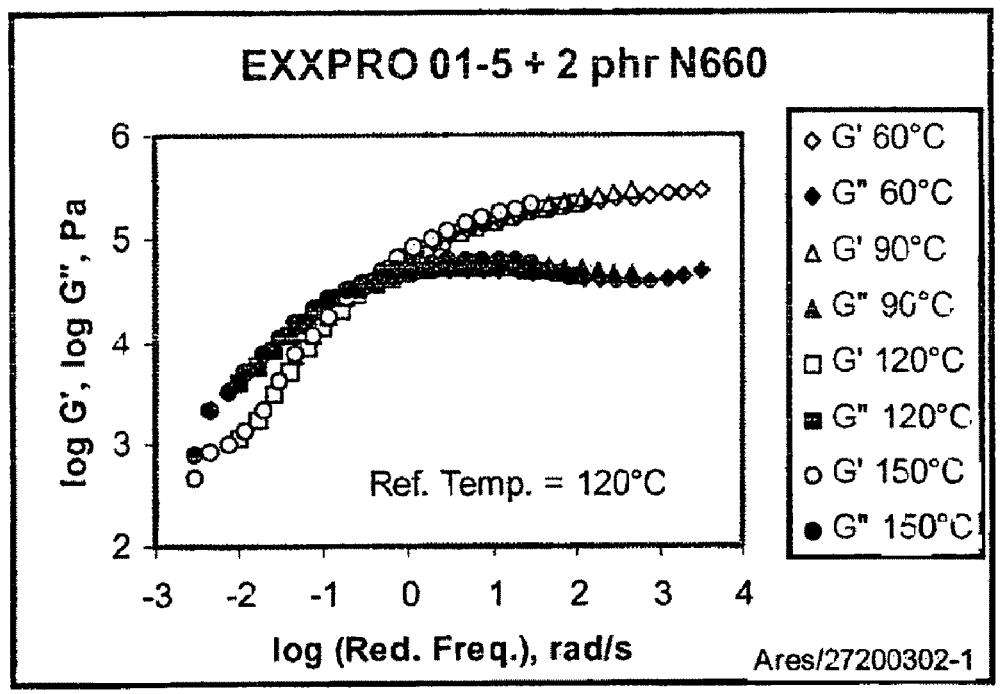
FIGS. 9A-9E show the time-temperature superimposed master curves of G' and G" for EXXPRO 01-5/N660 composites at different N660 carbon black concentrations.
Figure 9B:
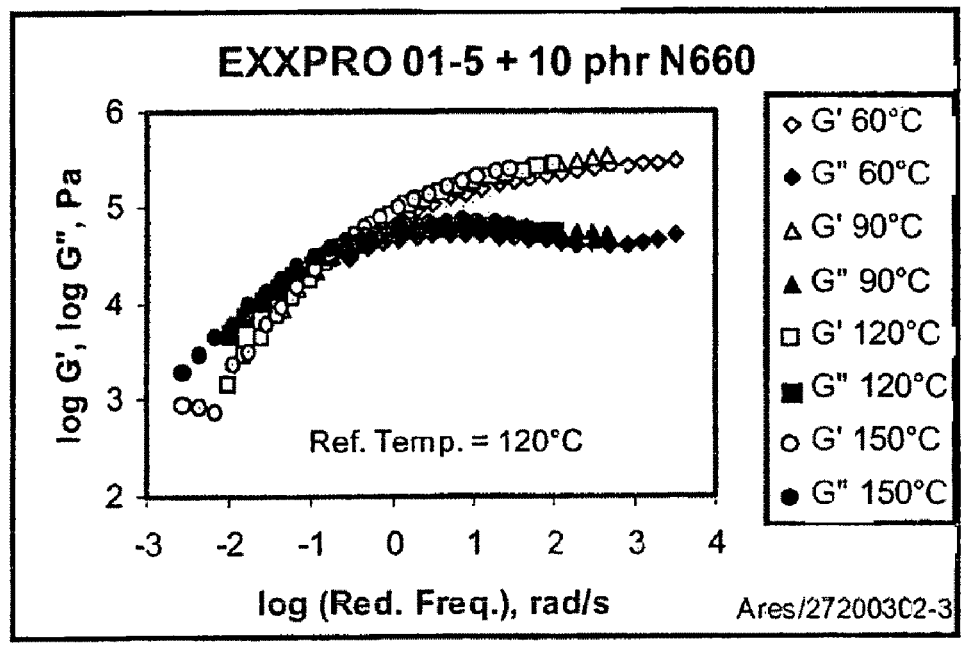
Figure 9C:
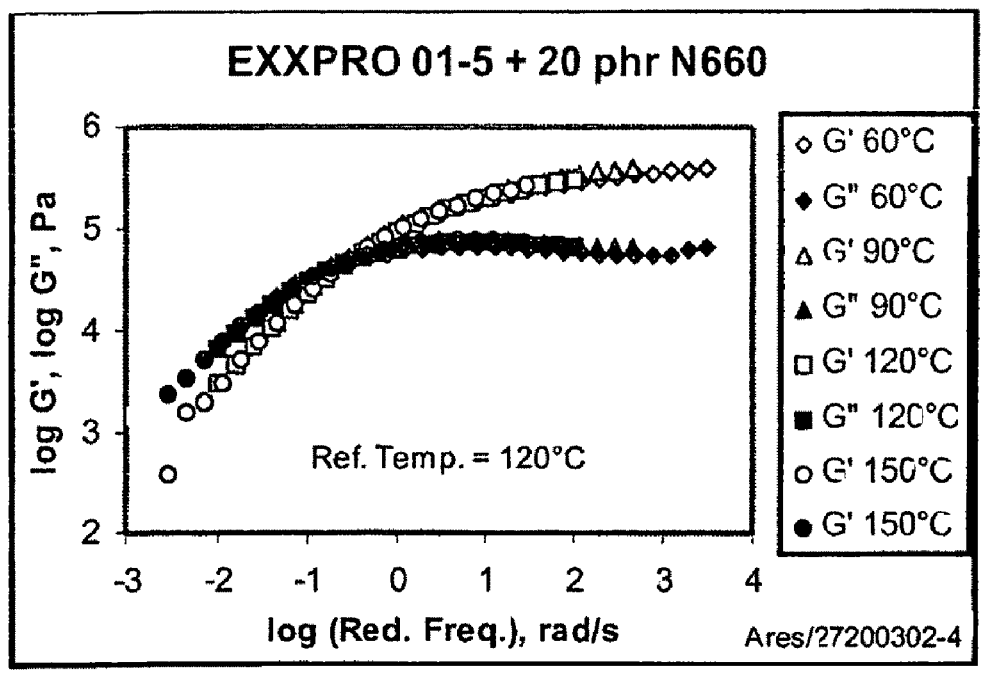
Figure 9D:
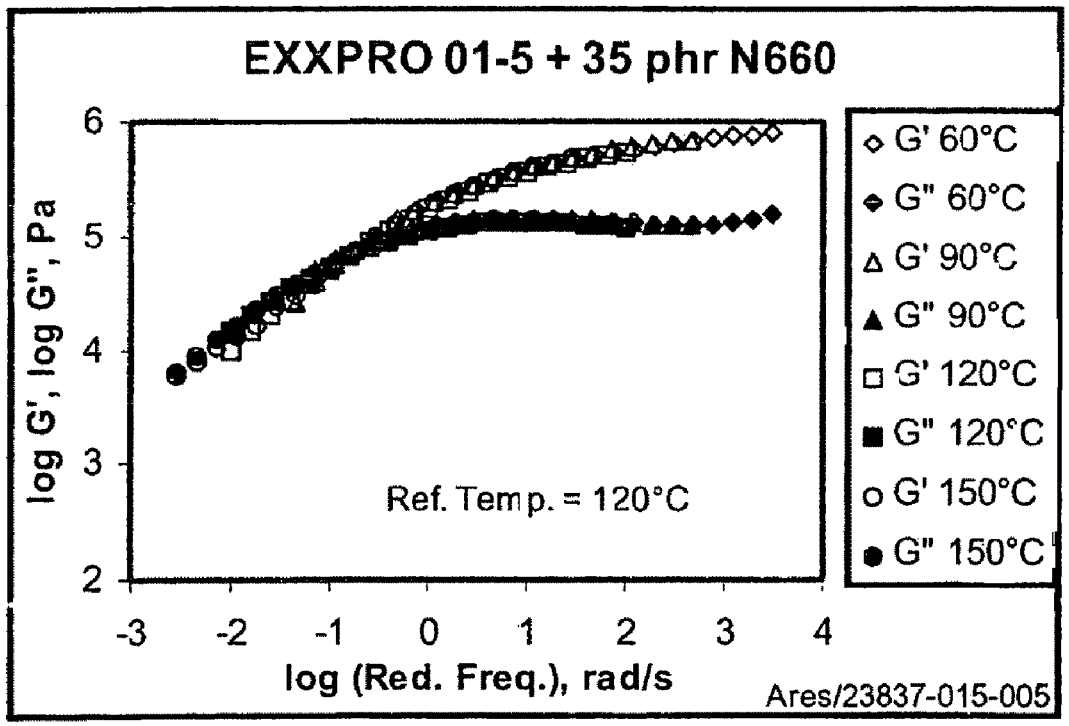
Figure 9E:
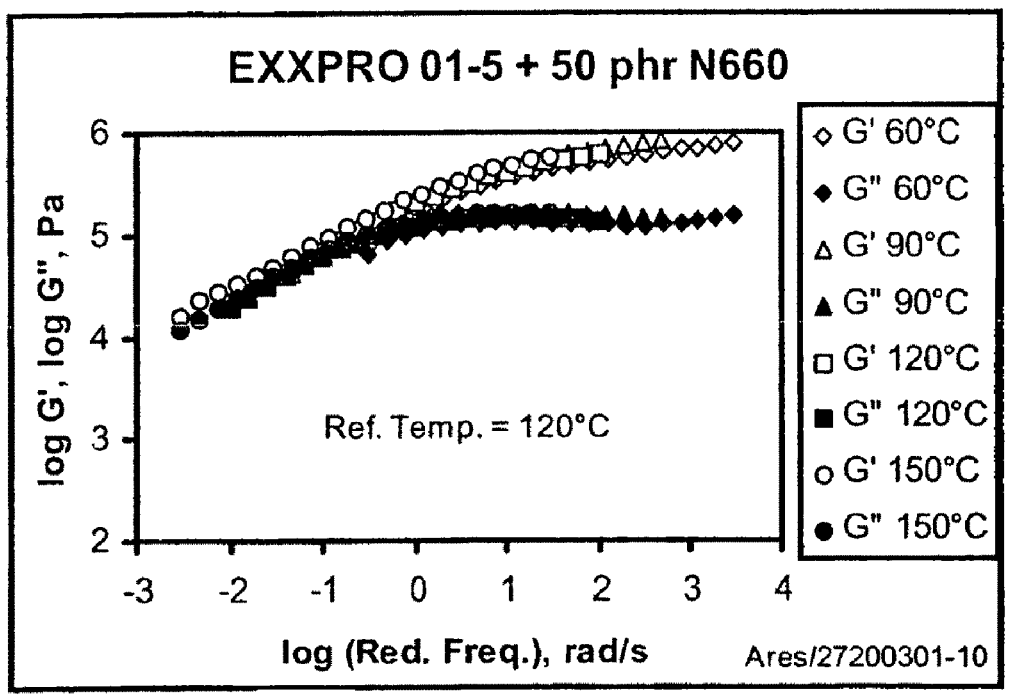
Figure 10A:
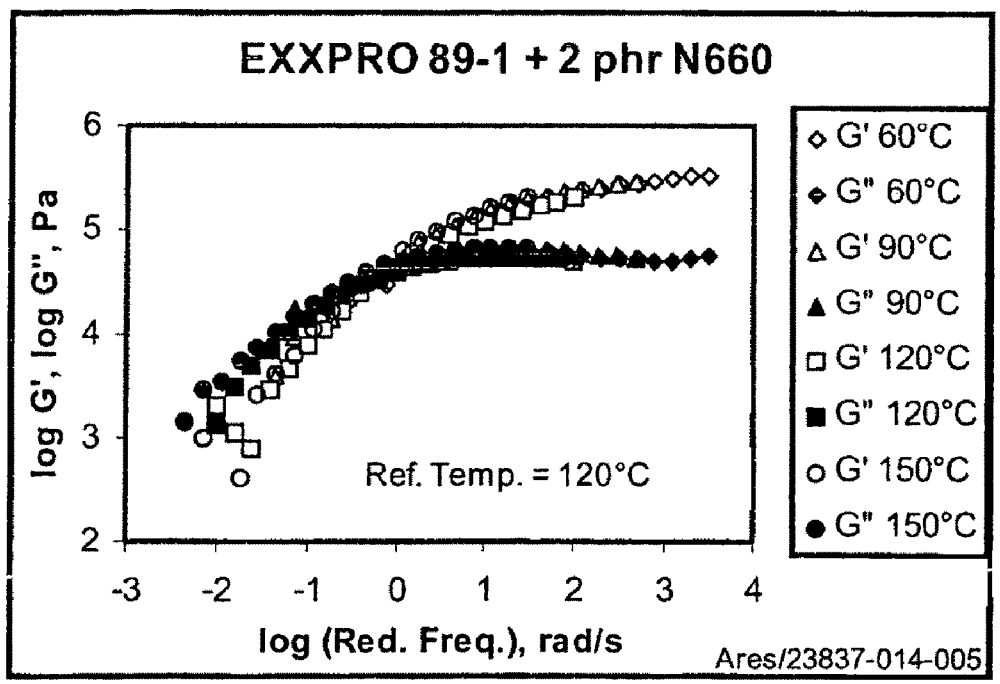
FIGS. 10A-10D show time-temperature superimposed master curves of G' and G" for EXXPRO 89-1/N660 composites at different N660 carbon black concentrations.
Figure 10B:
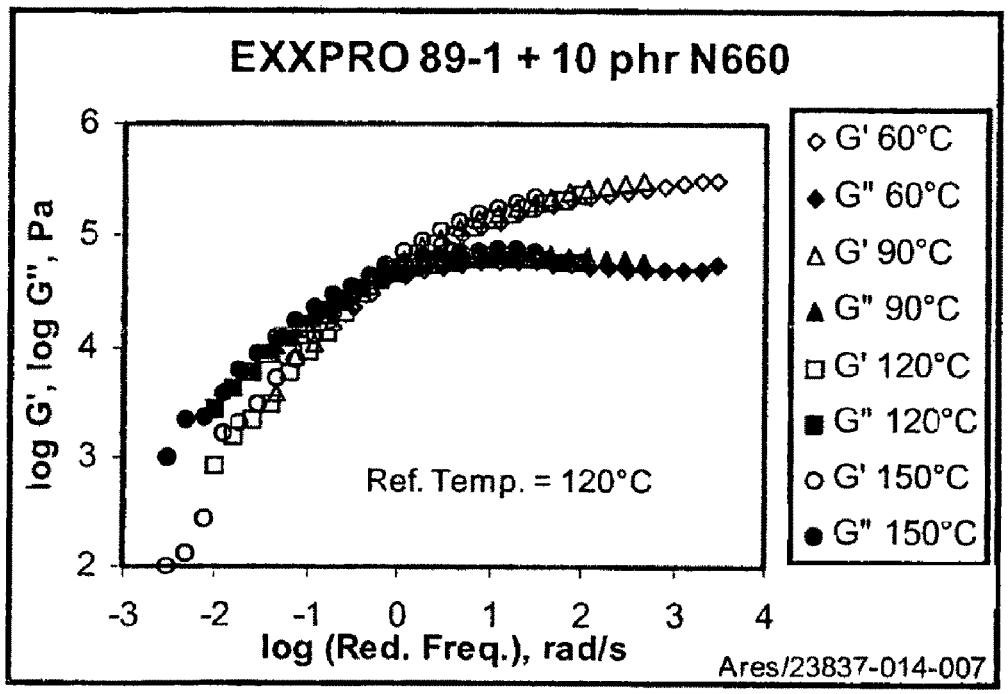
Figure 10C:
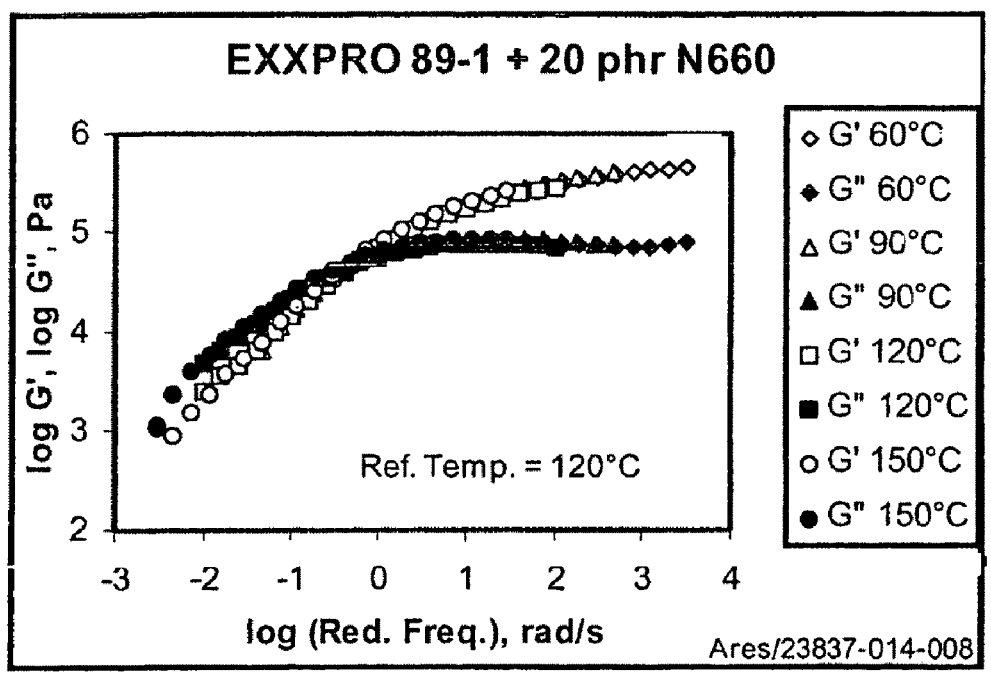
Figure 10D:
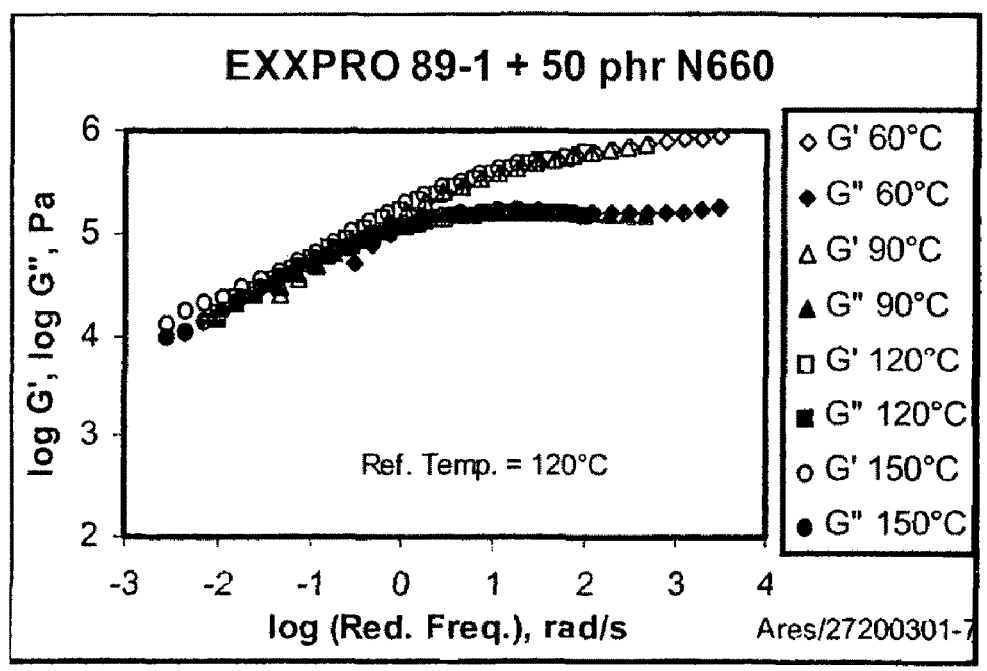
Figure 11A:
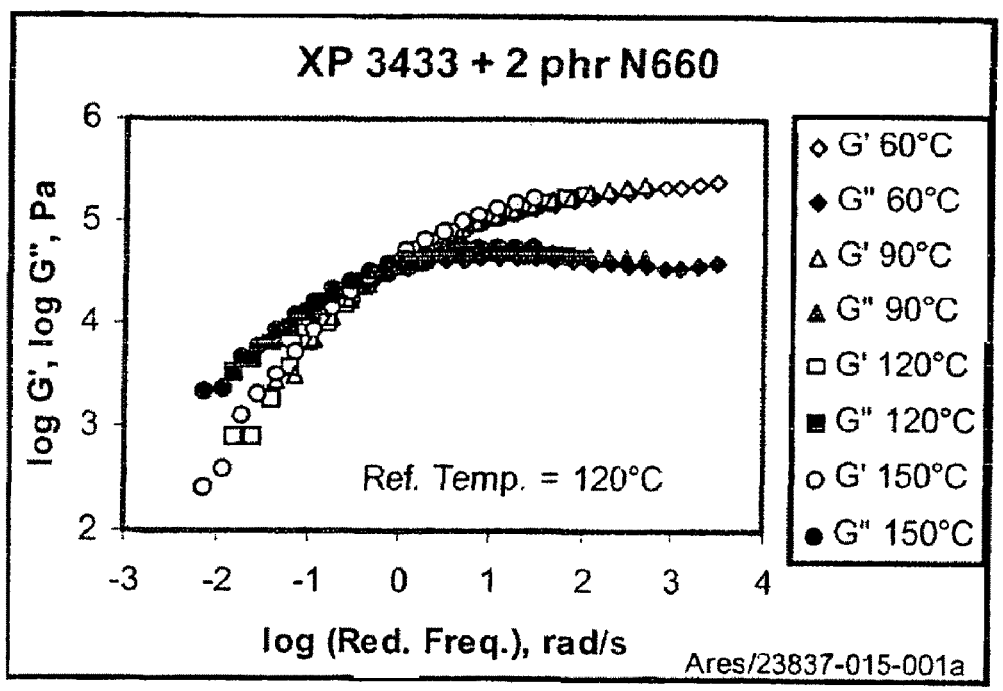
FIGS. 11A-11E show time-temperature superimposed master curves of G' and G" for low Mooney viscosity EXXPRO (XP 3433*)/N660 composites at different N660 carbon black concentrations.
Figure 11B:
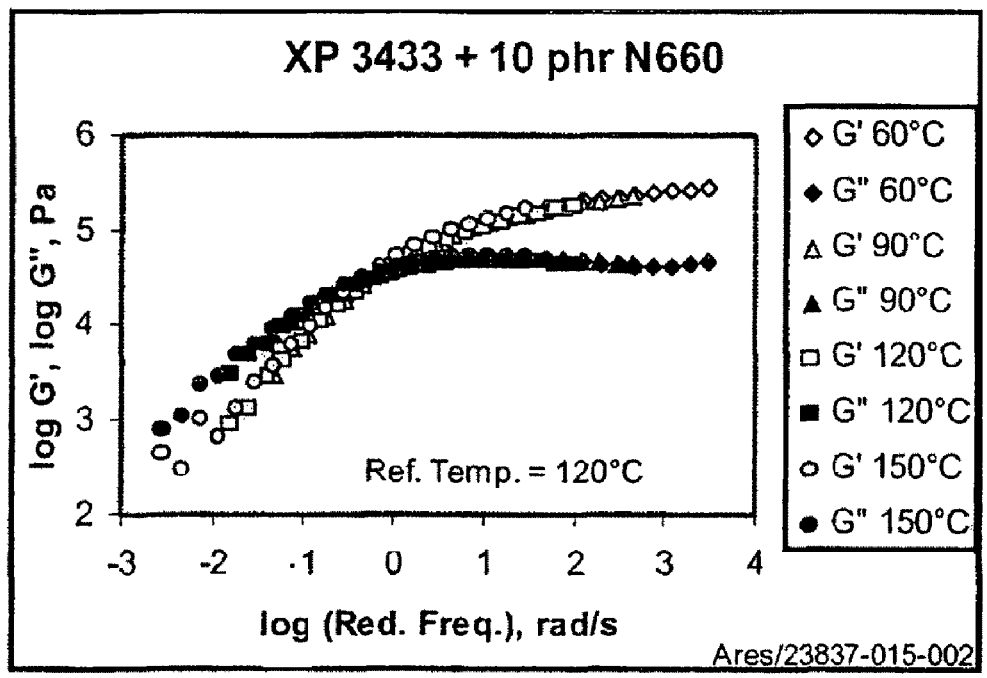
Figure 11C:
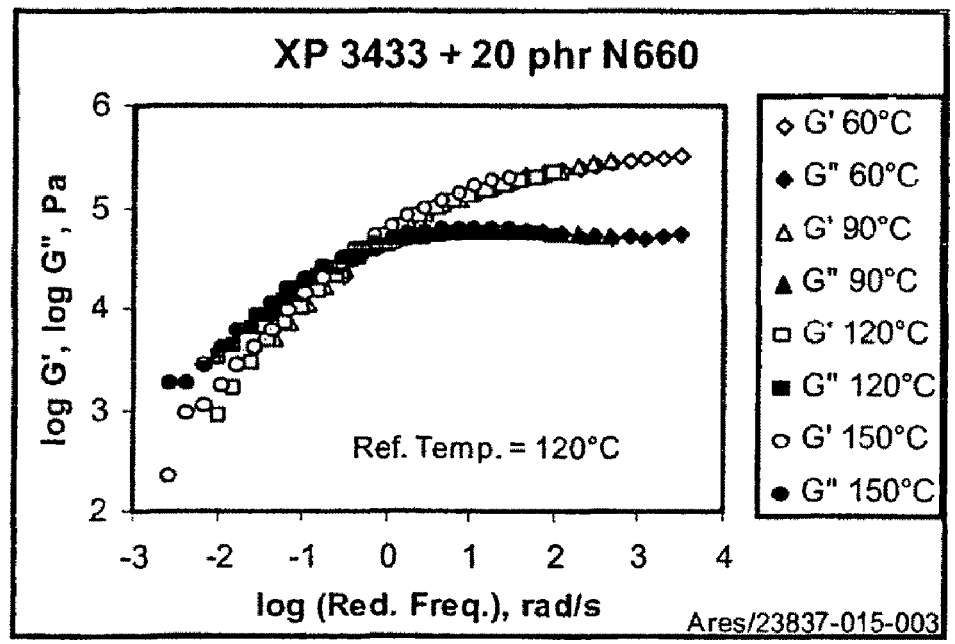
Figure 11D:
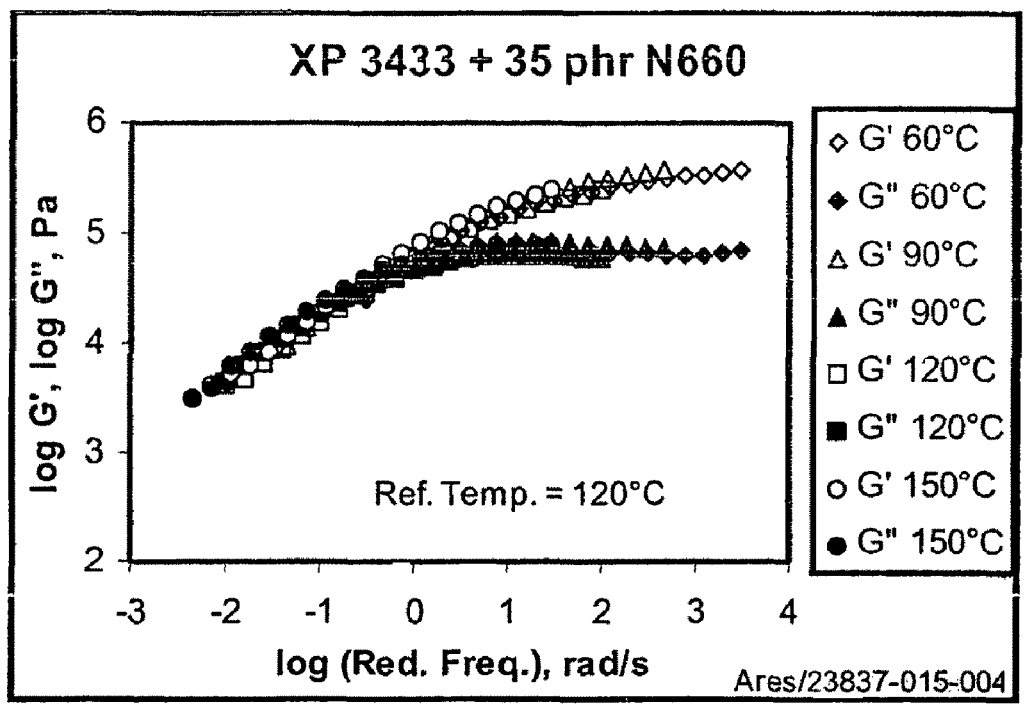
Figure 11E:
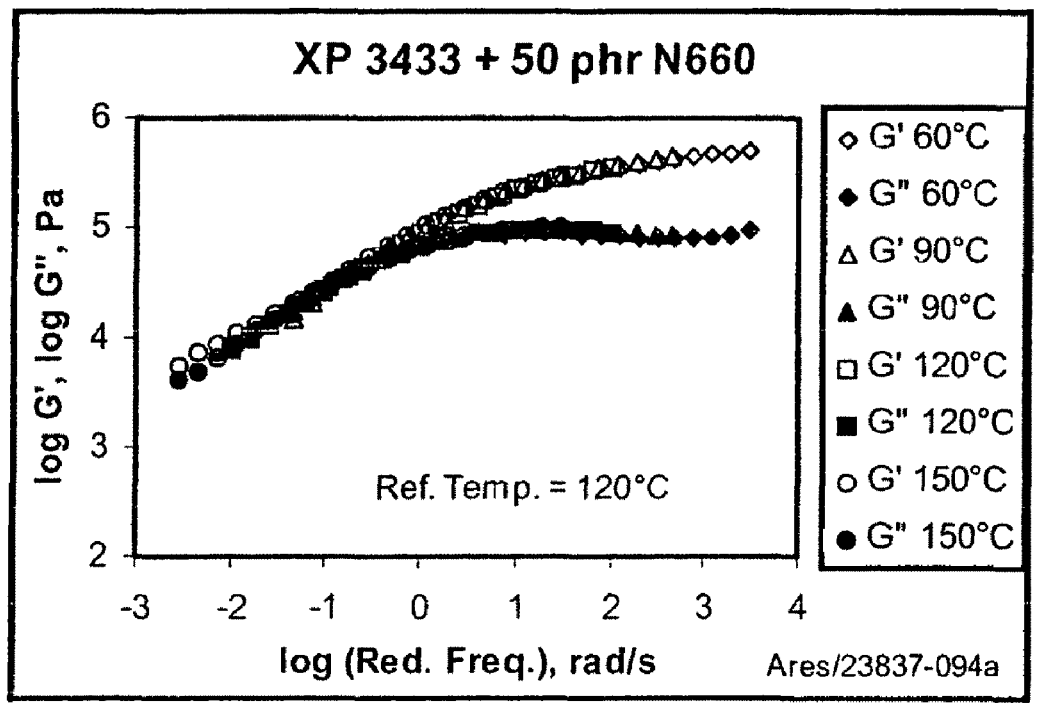

FIG. 8 and Tables 2 and 3 summarize the stress relaxation results and demonstrates the importance of the Mooney viscosity of the polymer on processability. It compares all the polymers tested as a function of N660 concentration. For the high Mooney viscosity polymers such as CX2 [EXXPRO 01-5] and CX3 [EXXPRO 89-1], both the time to relax to 1 kPa and the steady state viscosity increase sharply with increasing black concentration. For the low Mooney viscosity polymers such as X1 [XP 3433*] and CX1 [BIIR 2222], they remain relatively flat or proportional to carbon black loading, even at the higher carbon black concentration investigated. Overall, it appears that Mooney viscosity or molecular weight of BIMSM is more important than BIMSM/N660 interactions in controlling processability, as shown by the results in FIGS. 2-8.

TABLE 2

Time in seconds to relax to 1 kPa vs. carbon black loading

| N660, phr | CX1 [BIIR 2222], s | CX2 [EXXPRO 01-5], s | CX3 [EXXPRO 89-1], s | X1 [EXXPRO 03-1] (Invention), s |
|---|---|---|---|---|
| 0 | 74 | 90 | 60 | 48 |
| 2 | 100 | 110 | 70 | 90 |
| 5 | 100 | 110 | 70 | |
| 10 | 110 | 110 | 70 | 100 |
| 20 | 110 | 110 | 80 | 110 |
| 35 | | 300 | | 170 |
| 50 | 110 | 700 | 460 | 200 |

TABLE 3

Steady state viscosity in kPa-s vs. carbon black loading

| N660, phr | CX1 [BIIR 2222], kPa-s | CX2 [EXXPRO 01-5], kPa-s | CX3 [EXXPRO 89-1], kPa-s | X1 [EXXPRO 03-1] (Invention), kPa-s |
|---|---|---|---|---|
| 0 | 572 | 872 | 530 | 429 |
| 2 | 719 | 998 | 549 | 610 |
| 5 | 798 | 1027 | 543 | |
| 10 | 832 | 1096 | 617 | 710 |
| 20 | 978 | 1190 | 704 | 890 |

TABLE 3-continued

Steady state viscosity in kPa-s vs. carbon black loading

| N660, phr | CX1 [BIIR 2222], kPa-s | CX2 [EXXPRO 01-5], kPa-s | CX3 [EXXPRO 89-1], kPa-s | X1 [EXXPRO 03-1] (Invention), kPa-s |
|---|---|---|---|---|
| 35 | | 2440 | | 1270 |
| 50 | 1112 | 4418 | 2715 | 1270 |

As described before, the small-strain measurements were performed in the ARES Analyzer. The strain was only 1 or 2%. Each sample was run at four different temperatures. The results were superimposed at a reference temperature of 120° C. using the WLF equation based on polyisobutylene as described in J. D. Ferry, *Viscoelastic Properties of Polymers*, 3rd Ed.; John Wiley & Sons, Inc., New York (1980). FIG. 9 shows the storage modulus (G') and loss modulus (G") results as a function of reduced frequency of CX2 [EXXPRO 01-5] loaded with different amounts of N660. The open and filled symbols represent G' and G", respectively. At low carbon black loading, G' was always lower than G" in the low frequency region. The composite could be described as showing a liquid-like behavior. With increasing carbon black loading, G' gradually increased until it reached a similar magnitude as G". At this point, the composite could be described as exhibiting a gel-like or pseudo-solid-like behavior. This gel-like behavior occurred when the filler had a high enough concentration and/or the polymer had strong enough interactions with the filler so that the filler particles began to percolate through the polymer to form a continuous network. For these CX2 [EXXPRO 01-5]/N660 composites, 35 phr N660 was the percolation threshold. Usually, the lower the percolation threshold, the stronger the polymer/filler interactions.

As shown in FIG. 10, when CX3 [EXXPRO 89-1] was used, the percolation threshold was somewhere between 20 and 50 phr N660. More likely, it was still in the neighborhood of 35 phr N660, similar to the CX2 [EXXPRO 01-5]/N660 composites. The percolation threshold of N660 in the low Mooney viscosity X1 [XP 3433*] was also around 35 phr N660, as seen in FIG. 11.

Figure 12:
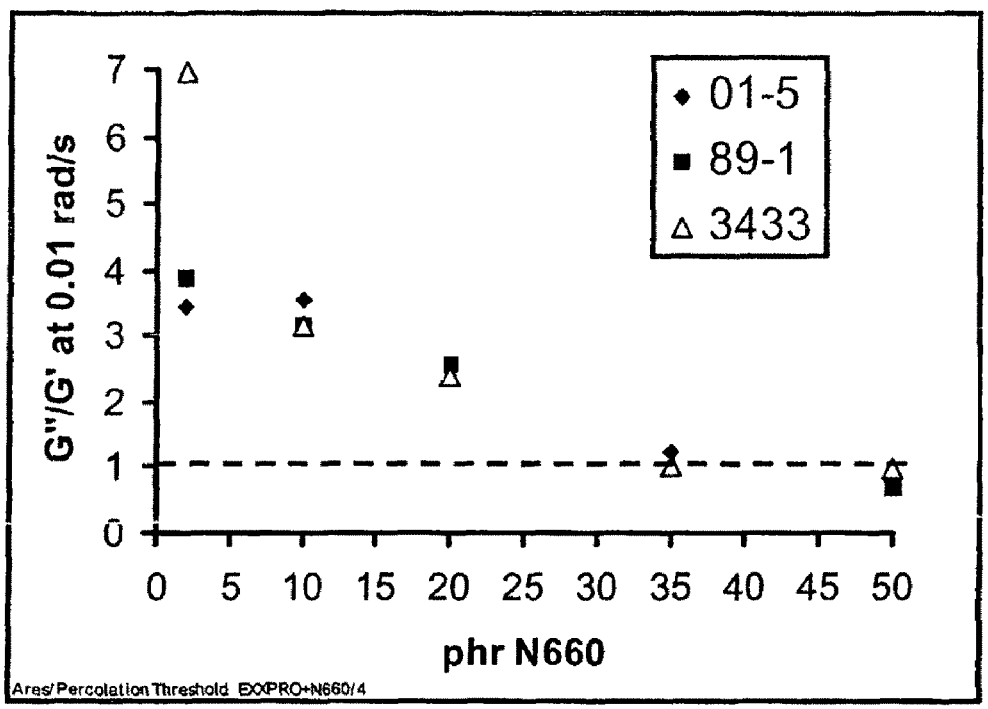
FIG. 12 shows values of G"/G' at $10^{-2}$ rad/s for EXXPRO 01-5, EXXPRO 89-1 and XP-3433* at different N660 carbon black concentrations.
Figure 13A:
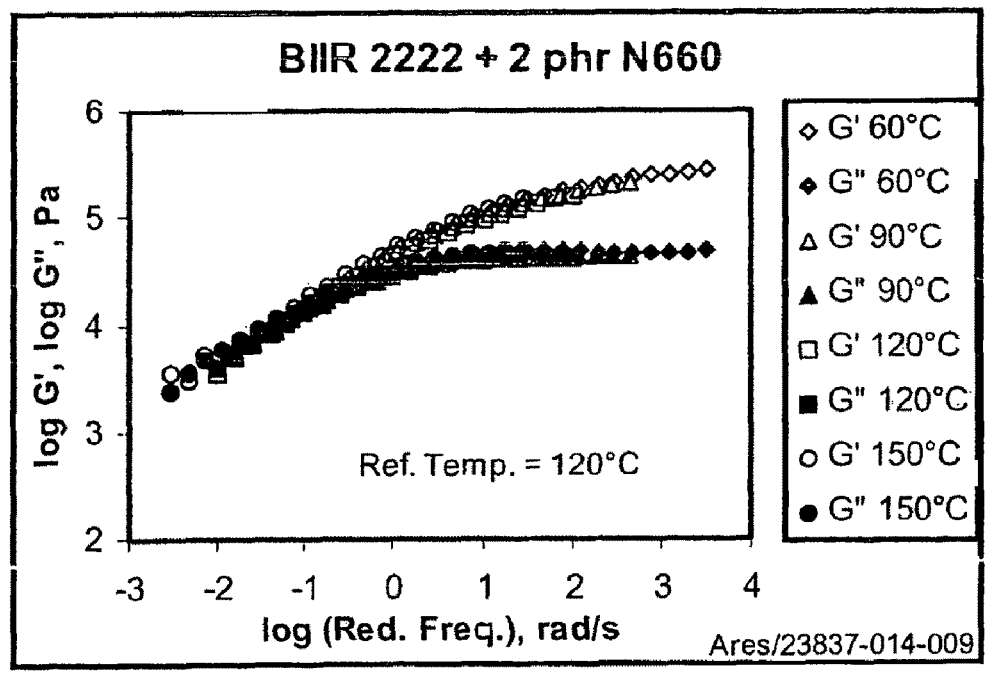
FIGS. 13A-13D show time-temperature superimposed master curves of G' and G" for BIIR 2222/N660 composites at different N660 carbon black concentrations.
Figure 13B:
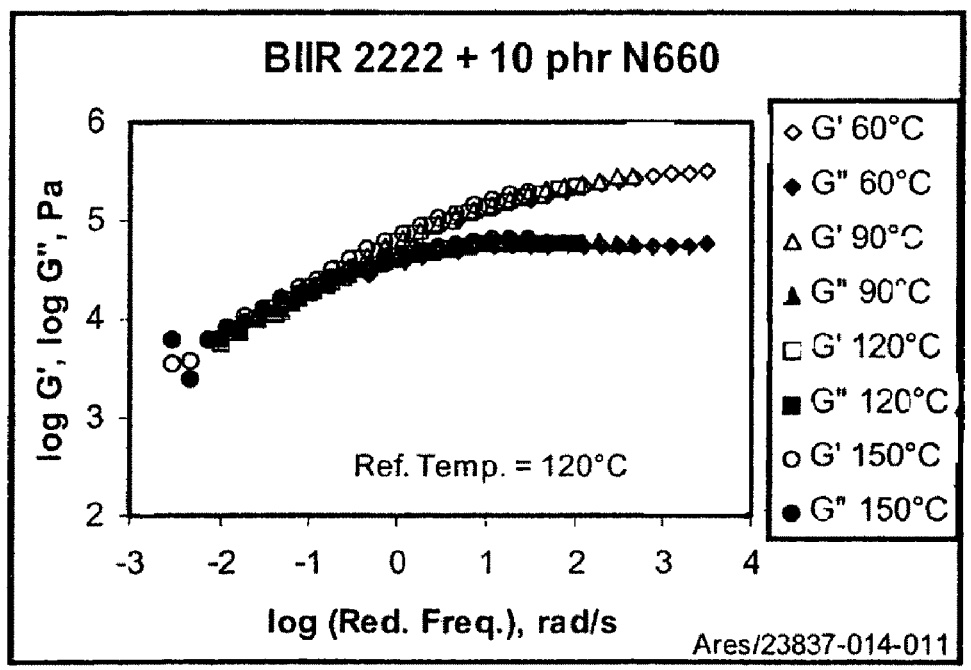
Figure 13C:
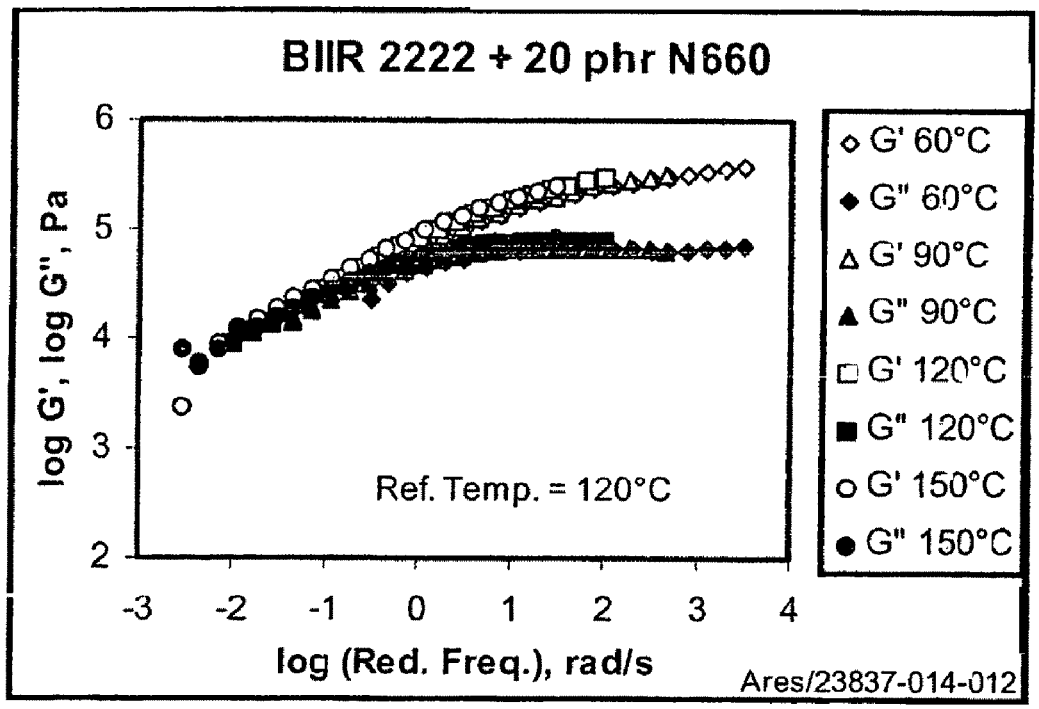
Figure 13D:
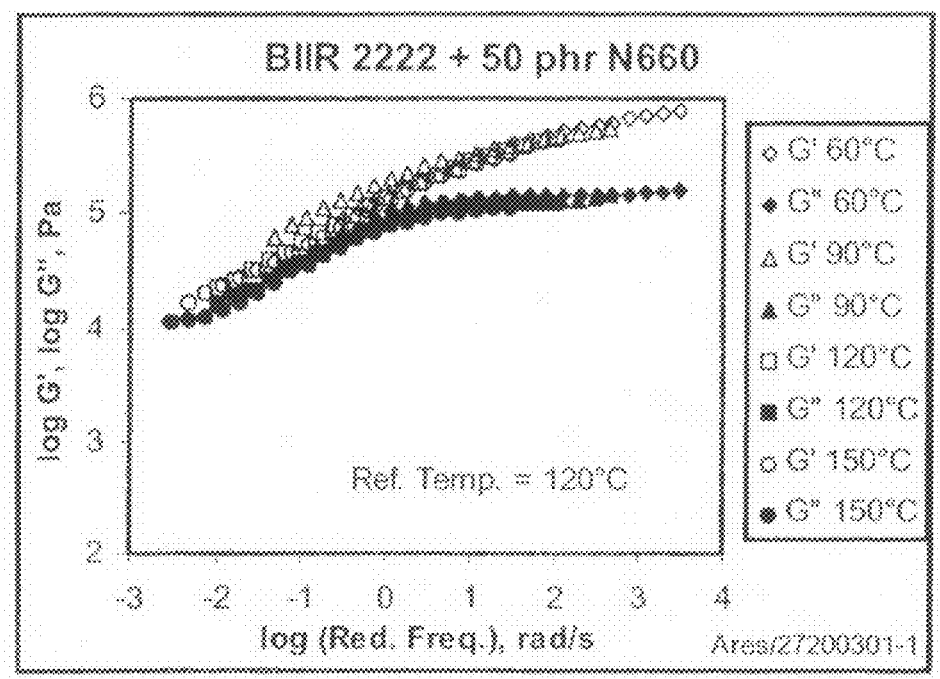

FIG. 12 shows the values of $G''/G'=\tan\delta$ at $10^{-2}$ rad/s based on the master curves of G' and G" in FIGS. 9-11. Therefore, for 3 different BIMSM elastomers filled with the less reinforcing N660, the percolation thresholds were all 35 phr N660 when $G''/G'=\tan\delta\approx1$ at $10^{-2}$ rad/s. This suggests that CX2 [EXXPRO 01-5], CX3 [EXXPRO 89-1] and X1 [XP 3433*] have similar interactions with N660 based on the concept of percolation threshold. Comparing these data to results for CX4 [EXXPRO 90-10] and its backbone filled with the more reinforcing N234 (as reported in Y. Yurekli et al., "Structure and Dynamics of Carbon Black-Filled Elastomers", *J. Polym. Sci., Polym. Phys. Ed.*, vol. 39, p. 256 (2001), and M. F. Tse et al., "Structure and Dynamics of Carbon Black Filled Elastomers II, IMS and IR", *Rubber World*, vol. 228, no. 1, p. 30 (2003)), interactions of BIMSM elastomers with N660 are not quite as strong, similar to a backbone with N234. The percolation thresholds of N234 in CX4 [EXXPRO 90-10] and its backbone CX4BB are 20 and 35 phr, respectively.

Unfortunately, the percolation threshold of N660 in CX1 [BIIR 2222] could not be determined using the small-strain measurements. Even at 2 phr N660, G' for CX1 had a similar magnitude to G" probably because crosslinking of CX1 [BIIR 2222] occurred after prolonged heating of the composite in the ARES temperature controlled oven, FIG. 13. It is believed dehydrobromination was initiated so that the BIIR was converted into a conjugated diene butyl (CDB) and the composite became crosslinked.

From the foregoing data, it can be concluded that a BIMSM elastomer with similar Mooney viscosity or molecular weight as CX1 [BIIR 2222] revealed a similar degree of stress relaxation as the latter polymer at different N660 concentrations, based on RPA measurements to study large-strain non-linear viscoelastic behavior (strain=100%). It can also be concluded that BIMSM elastomers with different molecular weights and compositions exhibited a similar degree of interaction with N660 based on the concept of percolation threshold, based on the ARES measurements to study small-strain linear viscoelastic behavior (strain=1-2%). Overall, BIMSM/N660 interactions were not strong.

Without direct evidence, it is speculated that, for a less interacting carbon black such as N660, a large strain of 100% in the RPA will de-wet or de-bond the polymer chains from the filler surface. This is known as the Payne effect. See A. R. Payne, *J. Appl. Polym. Sci.*, vol. 6, p. 57 (1962); A. R. Payne, *Rubber Chem. Technol.* Vol. 36, 147, p. 432 (1963); A. R. Payne, in *Reinforcement of Elastomers*, G. Kraus, Ed., Interscience, New York, p. 69 (1965); A. R. Payne, *Rubber Chem. Technol.*, vol. 44, p. 441 (1971). Another description of the Payne effect in the literature is that a large strain will be able to break down the filler agglomerate network and release the trapped polymer chains. This Payne effect will be more pronounced at high carbon black concentrations due to strain amplification. J. J. Aklonis et al. in *Introduction of Polymer Viscoelasticity*, John Wiley & Sons, Inc.: New York, 1972. If the filled rubber is deformed, the filler essentially remains undeformed because it is so much more rigid than the rubber. Therefore, all the applied strain will be delivered to the rubbery phase of the sample. The actual strain, $\epsilon$, sustained by the rubber is greater than the applied strain, $\epsilon_o$:

$$\epsilon = \epsilon_o(1+2.5V_f+14.1V_f^2) \quad (3)$$

where $V_f$ is volume fraction of the filler. For 50 phr N660, $V_f \approx 0.2$ and $\epsilon \approx 2.1\epsilon_o$. Therefore, the rubber filled with 50 phr N660 will experience a strain of 210% even though the applied strain in the RPA is only 100%. All these Payne and strain amplification effects tend to make stress relaxation depend predominantly on the molecular weight or Mooney viscosity of the polymer because relaxation time ($\tau_R$) of a high polymer is proportional to $\sim M^{3.5}$. Of course, a slight improvement in processability might be achieved by further reducing polymer/N660 interactions, e.g. by lowering the functionality on the carbon black and/or in the polymer (lower bromine content in BIMSM).

BIMSM/Carbon Black/Clay Nanocomposites

Because BIMSM can be blended with carbon black (CB) and organoclay used in nanocomposite applications, the RPA curves (log-log plots of the shear modulus, G, versus time, t) of X2 [EXXPRO 03-1] and CX2 [EXXPRO 01-5] were compared to CX1 [BIIR 2222] when each of these polymers was loaded with 50 phr of N660 and 7 phr of Cloisite 6A (C6A). Organoclay C6A, in the form of a free flowing powder, was obtained from Southern Clay Products, Inc. and used as received. On the basis of data provided by Southern Clay, this organoclay contains the mineral base (montmorillonite clay: Wyoming Cloisite) and the surfactant (dimethyl dihydrogenated tallow quaternary ammonium chloride, DMDTA). DMDTA is a blend of surfactants prepared from natural products by Akzo Nobel. According to Akzo Nobel, the major component in this blend is dimethyl dioctadecyl ammonium chloride (DMDOA), while minor components included (in the order of decreasing content) dimethyl octadecyl hexadecyl ammonium chloride, dimethyl dihexadecyl ammonium chloride, and a small (<3 weight percent) amount of tertiary ammonium chlorides (such as dimethyl octadecyl ammonium chloride and dimethyl hexadecyl ammonium chloride). The characterization of C6A is summarized in Table 4.

TABLE 4

Material information for organoclay

| Material Property | C6A |
|---|---|
| Surfactant | DMDTA |
| Surfactant Content, Wt % | 45 |
| Effective Silicate Gallery Spacing, nm | 3.5 |

All the uncured rubber compounds containing N660 and C6A were prepared in a Brabender™ mixer. The mixing was performed at 130° C. and a rotor speed of 60 rpm. The rubber was added first. After 1 minute, the mixtures of N660 and C6A were slowly added. After a mixing time of 6 minutes, each blend was then discharged from the mixer. The large-strain stress relaxation of each blend was measured in the Rubber Process Analyzer RPA 2000 (Alpha Technologies) as described above. The experiment was performed at 100° C., operated in the shear mode with an initial applied strain of 100%. During testing the sample was housed in a closed cavity with a serrated surface and maintained under pressure to avoid wall slippage of the rather stiff, filled rubbers. Duplicate or triplicate measurements were performed on each sample to insure the reporting of accurate data.

Figure 14:
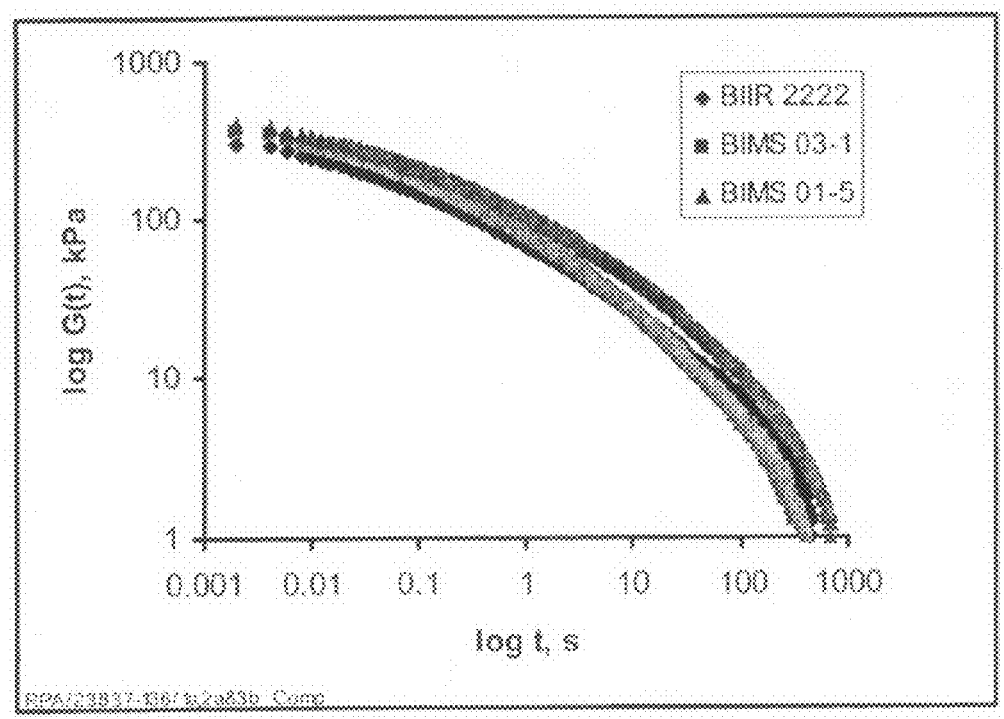
FIG. 14 shows G"/G' curves of polymer/50 phr CB/7 phr organoclay blends.

The RPA curves of CX1 [BIIR 2222]/N660/C6A, X2 [EXXPRO 03-1]/N660/C6A, and CX2 [EXXPRO 01-5]/N660/C6A are shown in FIG. 14. The first two blends take a relatively short time to relax to 1 kPa (0.15 psi). Also, see Table 5. The area under each stress relaxation curve in FIG. 14 is defined as the steady state viscosity. A faster relaxation will result in a smaller area, hence, a lower steady state viscosity or an improvement in processability. Again, X2 [EXXPRO 03-1]/N660/C6A has the lowest steady state viscosity, Table 6.

TABLE 5

Time in seconds to relax to 1 kPa

| N660, phr | C6A, phr | CX1 [BIIR 2222], s | CX2 [EXXPRO 01-5], s | X2 [EXXPRO 03-1] (Invention), s |
|---|---|---|---|---|
| 50 | 7 | 470 | 700 | 420 |

TABLE 6

Steady state viscosity in kPa · s

| N660, phr | C6A, phr | CX1 [BIIR 2222], kPa-s | CX2 [EXXPRO 01-5], kPa-s | X2 [EXXPRO 03-1] (Invention), kPa-s |
|---|---|---|---|---|
| 50 | 7 | 2825 | 4751 | 2212 |

Tire Processing

Suitable elastomeric compositions for such articles as air barriers, and more particularly tire curing bladders, innerliners, tire innertubes, and air sleeves, including gaskets and ring structures, were prepared by using conventional mixing techniques such as with a Banbury™ mixer. The sequence of mixing and temperatures employed are well known to the skilled rubber compounder, the objective being the dispersion of fillers, activators and curatives in the polymer matrix without excessive heat buildup. Table 7 is a list of useful components for the compositions.

A useful mixing procedure utilizes the Banbury™ mixer with tangential rotors in which the BIMSM, carbon black and plasticizer are added and the composition mixed for the desired time or to a particular temperature to achieve adequate dispersion of the ingredients. Mixing is performed at temperatures in the range from the melting point of the elastomer and/or secondary rubber used in the composition in one embodiment, from 40° C. up to 250° C. in another embodiment, and from 100° C. to 200° C. in yet another embodiment, under conditions of shear sufficient to allow the clay intercalate to exfoliate and become uniformly dispersed within the polymer to form the nanocomposite.

Typically, from 70% to 100% of the elastomer or elastomers is first mixed for 20 to 90 seconds, or until the temperature reaches from 40° C. to 75° C. Then, ¾ of the filler, and the remaining amount of elastomer, if any, are typically added to the mixer, and mixing continues until the temperature reaches from 90° C. to 150° C. Next, the remaining filler is added, as well as the processing aid, and mixing continues until the temperature reaches from 140° C. to 190° C. The masterbatch mixture is then finished by sheeting on an open mill and allowed to cool, for example, to from 60° C. to 100° C. when the curatives are added.

Mixing with the clays is performed by techniques known to those skilled in the art, wherein the clay is added to the polymer at the same time as the carbon black in one embodiment. The processing aid is typically added later in the mixing cycle after the carbon black and clay have achieved adequate dispersion in the elastomeric matrix.

An innerliner stock is then prepared by calendering the compounded rubber composition into sheet material having a thickness of roughly 1 to 2 mm (40 to 80 mil gauge) and cutting the sheet material into strips of appropriate width and length for innerliner applications. The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. The pneumatic tire is composed of a layered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix and an innerliner layer which is laminated to the inner surface of the carcass layer. Tires are normally built on a tire forming drum using the layers described above. After the uncured tire has been built on the drum, the uncured tire is placed in a heated mold having an inflatable tire shaping bladder to shape it and heat it to vulcanization temperatures by methods well known in the art. Vulcanization temperatures generally range from about 100° C. to about 250° C., more preferably from 125° C. to 200° C., and times may range from about one minute to several hours, more preferably from about 5 to 30 minutes for passenger car tires. Vulcanization of the assembled tire results in vulcanization of all elements of the tire assembly, for example, the innerliner, the carcass and the outer tread/sidewall layers and enhances the adhesion between these elements, resulting in a cured, unitary tire from the multi-layers.

Tire Testing

Test methods are summarized in Table 8. Cure properties were measured using a MDR 2000 and 0.5 degree arc at the indicated temperature. Test specimens were cured at the indicated temperature, typically from 150° C. to 180° C., for a time corresponding to t90+appropriate mold lag. The values "MH" and "ML" used here and throughout the description refer to "maximum torque" and "minimum torque," respectively. The "MS" value is the Mooney scorch value, and the "ML (1+4)" value is the Mooney viscosity value. The error (2σ) in the later measurement is ±0.65 Mooney viscosity units. The values of "t" are cure times in minutes, and "ts" is "scorch time" in minutes.

TABLE 7

Various Components in the Compositions

| Component | Brief Description | Commercial Source |
|---|---|---|
| Bromobutyl 2222 | Brominated butyl rubber, 27-37 Mooney viscosity | ExxonMobil Chemical Company (Houston, TX) |
| EXXPRO ™ (BIMSM) 01-5 | Brominated poly(isobutylene-co-p-methylstyrene), 0.85 ± 0.1 mol % benzylic Br; 10 ± 0.5 wt % p-methylstyrene, 40-50 Mooney viscosity | ExxonMobil Chemical Company (Houston, TX) |
| EXXPRO ™ (BIMSM) 03-1 | Brominated poly(isobutylene-co-p-methylstyrene), 0.85 ± 0.1 mol % benzylic Br; 10 ± 0.5 wt % p-methylstyrene, 27-37 Mooney viscosity | ExxonMobil Chemical Company (Houston, TX) |
| CLOISITE ® 6A | Dimethylditallow ammonium chloride modified montmorillonite clay | Southern Clay Products (Gonzalez, TX) |
| CALSOL ® 810 | Naphthenic Oil, ASTM Type 103 | R. E. Carroll, Inc (Trenton, NJ) |
| PARAPOL ® | $C_4$ raffinate | ExxonMobil Chemical Company (Houston, TX) |
| SP-1068 | Alkyl phenol formaldehyde resin | Schenectady Int. (Schenectady, NY) |
| STRUKTOL ® 40 MS | Composition of aliphatic-aromatic-naphthenic resins | Struktol Co. of America (Stow, OH) |
| KADOX ® 930 | High Purity French Process Zinc Oxide | Zinc Corp. of America (Monaca, PA) |
| MBTS | 2-Mercapto-benzothiazole disulfide | R. T. Vanderbilt (Norwalk, CT) or Elastochem (Chardon, OH) |

When possible, standard ASTM tests were used to determine the cured compound physical properties (see Table 8). Stress/strain properties (tensile strength, elongation at break, modulus values, energy to break) were measured at room temperature using an Instron 4202 or an Instron Series IX Automated Materials Testing System 6.03.08. Tensile measurements were done at ambient temperature on specimens (dog-bone shaped) width of 0.25 inches (0.62 cm) and a length of 1.0 inches (2.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data were recorded. The average stress/strain value of at least three specimens is reported. The error ($2\sigma$) in tensile strength measurements is ±0.47 MPa units. The error ($2\sigma$) in measuring 100% modulus is ±0.11 MPa units; the error ($2\sigma$) in measuring elongation at break is ±13% units. Shore A hardness was measured at room temperature by using a Zwick Duromatic.

Permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\sigma$) in measuring air permeability is ±0.245 ($\times 10^8$) units.

Oxygen permeability was measured using a MOCON OxTran Model 2/61 operating under the principle of dynamic measurement of oxygen transport through a thin film as published by Pasternak et al. in *Journal of Polymer Science*: Part A-2, vol. 8, p 467 (1970). The units of measure are cc-mm/$m^2$-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Inflation Pressure Retention (IPR) was tested in accordance to ASTM F1112 by the following method: The tires were mounted on standard rims and inflated to 240 kPa±3.5 kPa. A T-adapter is connected to the valve allowing a calibrated gauge to be connected to one side and inflation air to be added through the other. The tires are checked for leaks, conditioned for 48 hours @ 21° C.±3° C. for 48 hours and again checked for leaks. The inflation pressure is then recorded over a three month time frame. The IPR is reported as the percent of inflation pressure loss per month.

The Intracarcass Pressure (ICP) is run as follows: The tires are mounted on standard rims and inflated to 240 kPa±3.5 kPa. The tires are connected to a constant inflation pressure system, which uses a calibrated gauge to maintain the inflation at 240 kPa±3.5 kPa. The tires are checked for leaks, conditioned for 48 hours @ 21° C.±3° C. and again checked for leaks. Typically five calibrated gauges with hypodermic needles are then inserted into the tire with the tip of the needle set on the carcass cord. The readings are taken until the pressure at the cord interface equilibrates (normally 2 months). The ICP is reported as the average of the readings.

Tires were tested according to the procedures specified in the Federal Motor Vehicle Safety Standards No. 139 (see Federal Register/Vol. 68, No. 123, p 38116). Tests performed were FMVSS 139 High Speed, FMVSS 139 Endurance, and FMVSS 139 Low Inflation tests. Tires were mounted on reinforced steel rims of standard size and inflated with air to the specified pressure for each test. For the FMVSS 139 Low Inflation and Endurance tests a pressure of 220 kPa±3.5 kPa of air inflation was used. For the FMVSS 139 Low Inflation test a pressure of 140 kPa±3.5 kPa of air inflation was used. Tires were loaded on the machine and tested at the specified load steps for the specified time intervals against a 1.707 m wheel running at the specified speed steps in a room at 38° C.±3° C.

Tests were also run according to FMVSS 139 procedures but after successful completion of the specified FMVSS 139 tests, tires were allowed to continue to run against the wheel at the final load step and speed step setting until a failure terminated the test by automatically tripping a detector to shut off the machine. Tests performed were FMVSS 139 High Speed to failure, FMVSS 139 Endurance to failure, and FMVSS 139 Low Inflation to failure. Results are expressed as hours until failure.

Tire Durability Testing was run by mounting the tires on reinforced steel rims of standard size. The tires were inflated to 240 kPa±3.5 kPa using a 50/50 $O_2/N_2$ mixture and loaded on the test machine. The tires were run against a 28.5 cm wheel running at 84.5 km/hr in a room at 21° C.±3° C. The load was set using the 100% load for 207 kPa inflation as found in *The Tire Guide*. This normally gave a deflection of 30%. The tire was run for 1 hour at 50% load followed by 1 hour at 100% load. The inflation pressure was recorded and the pressure was adjusted to this level daily for the test duration. Tires were run until a failure terminated the test by automatically tripping a detector to shut off the machine. Results are expressed as hours until failure.

TABLE 8

Test Methods

| Parameter | Units | Test |
|---|---|---|
| Mooney Viscosity (polymer) | ML 1 + 8, 125° C., MU | ASTM D1646 |
| Mooney Viscosity (composition) | ML 1 + 4, 100° C., MU | ASTM D1646 |
| Green Strength (100% Modulus) | PSI | ASTM D412 |
| MOCON (@ 60° C.) | cc-mm/$m^2$-day-mmHg | See text |
| Air Permeability (@ 65° C.) | ($cm^3$-cm/$cm^2$-sec-atm) $\times 10^8$ | See text |
| Mooney Scorch Time | ts5, 125° C., minutes | ASTM D1646 |
| Oscillating Disk Rheometer (ODR) @ 160° C., ± 3° arc | | ASTM D2084 |
| Moving Die Rheometer (MDR) @160° C., ± 0.5° arc | | |
| ML | deciNewton-meter | |
| MH | deciNewton-meter | |
| ts2 | Minutes | |
| t50 | Minutes | |
| t90 | Minutes | |
| Physical Properties, press cured Tc 90 + 2 min @ 160° C. | | |
| Hardness | Shore A | ASTM D2240 |
| Modulus 20%, 100%, 300% | MPa | ASTM D412 die C |
| Tensile Strength | MPa | |
| Elongation at Break | % | |
| Energy to Break | N/mm (J) | |
| Hot Air Aging, | | ASTM D573 |

TABLE 8-continued

Test Methods

| Parameter | Units | Test |
|---|---|---|
| 72 hrs. @ 125° C. | | |
| Hardness | Shore A | |
| Modulus 20%, 100%, 300% | MPa | |
| Tensile Strength | MPa | |
| Elongation at Break | % | |
| Energy to Break | N/mm (J) | |
| DeMattia Flex | mm @ kilocycles | ASTM D813 modified |

Table 9 shows comparative examples. CX1 is a tire innerliner compound comprising bromobutyl rubber BIIR 2222. X2 illustrates the tire innerliner compound comprising EXXPRO (BIMSM) 03-1 elastomer of the invention described above.

TABLE 9

Components of CX1 and X2 Tire Innerliner Formulations, phr

| Ingredient | CX1, phr | X2, phr |
|---|---|---|
| Bromobutyl 2222 | 100 | |
| EXXPRO 03-1 | | 100 |
| Resin, SP1068 | 4 | 4 |
| Carbon Black N660 | 60 | 60 |
| Resin, STRUKTOL 40 MS | 7 | 7 |
| Processing Oil, TDAE | 8 | 8 |
| Cure Activator, Stearic Acid | 1 | 1 |
| Cure Activator, Zinc Oxide | 1 | 1 |
| Curative, Sulfur | 0.5 | 0.5 |
| Cure Accelerator, MBTS | 1.25 | 1.25 |

The CX1 and X2 examples were cured at 180° C. for a time equivalent to Tc90+appropriate mold lag time for the test. The examples were tested for various physical properties, the results of which are outlined in Table 10. The data show that use of X2 EXXPRO (BIMSM) maintains or improves properties compared to CX1, except for flex fatigue and adhesion to a natural rubber carcass compound, which are reduced.

TABLE 10

Properties of CX1 and X2 Tire Innerliners

| Properties | CX1 | X2 |
|---|---|---|
| Mooney Viscosity, ML (1 + 4) 100° C. | 66 | 69 |
| Mooney Scorch MS@135° C., T5 | 11.2 | 10.2 |
| Cure, MDR@180° C. | | |
| MH | 5.00 | 6.54 |
| ML | 1.52 | 1.29 |
| Ts2 | 1.72 | 1.48 |
| Tc50 | 1.56 | 1.65 |
| Tc90 | 2.90 | 2.69 |
| Physical | | |
| Hardness, Shore A | 47 | 50 |
| Stress/Strain, Original | | |
| Modulus 100% | 1.3 | 1.8 |
| Modulus 300% | 4.2 | 5.9 |
| Tensile strength | 9.7 | 9.9 |
| Elongation at break | 772 | 725 |
| Aged Hardness, Shore A, 72 h@125° C. | 57 | 59 |
| Stress/Strain, Aged 72 h@125° C. | | |
| Modulus 100% | 2.4 | 3.3 |
| Modulus 300% | 6.3 | 8.8 |
| Tensile strength | 7.5 | 10.6 |
| Elongation at break | 484 | 497 |
| Flex fatigue (kc) | 405 | 127 |
| Air permeability @ 65° C. | 3.47 | 3.38 |
| Adhesion to self | 29.0 | 28.8 |
| Adhesion to NR carcass | 26.3 | 11.7 |

The CX1 and X2 compositions were incorporated into a tire as the inner liners using automated building machines. All other tire components were normal production materials. Tires were press cured as is usual. CX1 and X2 were incorporated into a P205/60 SR15 passenger tire. Tires were tested for inflation pressure retention (IPR) (Table 11), FMVSS 139 test standards, FMVSS 139 test standards continued to failure, and tire durability. Tire IPR and FMVSS 139 testing to failure performance were maintained. As seen in Table 11, tire durability of X2 used in the innerliner was improved (increased) compared to CX1 used in the innerliner.

TABLE 11

Performance of Tires with CX1 and X2 Innerliner Compositions

| Performance Property | CX1 | X2 |
|---|---|---|
| Tire Inflation Pressure Retention, %/month | 1.82 | 1.94 |
| FMVSS 139 High Speed, to failure, hours | 86.4 | 81.5 |
| FMVSS 139 Endurance, to failure, hours | 97.0 | 74.8 |
| FMVSS 139 Low Inflation, to failure, hours | 17.6 | 12.6 |
| Tire Durability, Tread Separation Test, hours | 680.0 | 802.5 |

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. An elastomeric composition, the elastomeric composition being a curable, filled rubber formulation, comprising:
    a halogenated interpolymer of a $C_4$ to $C_7$ isoolefin and from 8 to 10 weight percent alkylstyrene and comprising from 0.2 to 2 mole percent haloalkylstyrene, a Mooney viscosity between 28 and 32, a number average molecular weight of between 200,000 and 240,000, a weight average 'molecular weight of between 320,000 and 440,000, a z average molecular weight of between 450,000 and 650,000, and a branching index (g') from 0.4 to 1.1, and 20 to 100 phr of a carbon black filler,
    wherein the elastomeric composition has a characteristic time for stress relaxation at 100° C. from an initially applied strain of 100% to 1 kPa of less than 300 seconds.
2. The elastomeric composition of claim 1 wherein the isoolefin comprises isobutylene, the alkylstyrene comprises p-methylstyrene and the halogen comprises bromine.

3. The elastomeric composition of claim 2, wherein the interpolymer comprises at least 70 mole percent isobutylene, and from 0.5 to 1.5 mole percent bromomethylstyrene.

4. The elastomeric composition of claim 1 comprising a characteristic steady state viscosity less than 2000 kPa-s.

5. The elastomeric composition of claim 4 comprising from 1 to 30 phr clay.

6. The elastomeric composition of claim 2, further comprising secondary rubber, processing aid, curative, antidegradant, softener, or a combination thereof.

7. A method of making a cured, filled rubber article, comprising: compounding an elastomeric composition with 20 to 100 phr of a carbon black and curative;
wherein the elastomeric composition comprises a brominated interpolymer of isobutylene and from 8 to 10 weight percent p-methylstyrene and comprising from 0.2 to 2 mole percent bromomethylstyrene, a Mooney viscosity between 28 and 32, a number average molecular weight of between 200,000 and 240,000, a weight average molecular weight of between 320,000 and 440,000, a z average molecular weight of between 450,000 and 650,000, and a branching index (g') from 0.4 to 1.1; and wherein the elastomeric composition has a characteristic time for stress relaxation at 100° C. from an initially applied strain of 100% to 1 kPa of less than 300 seconds;
processing the compounded composition to form a shape of the article; and
curing the composition to obtain the article in the formed shape.

8. The method of claim 7, wherein the interpolymer comprises at least 70 mole percent isobutylene, and from 0.5 to 1.5 mole percent bromomethylstyrene.

9. The method of claim 8 wherein the processing comprises deforming the compounded composition and maintaining the deformation for a period of time to effect stress relaxation to less than 1 kPa.

10. The method of claim 9 wherein the compounded composition comprises a characteristic steady state viscosity less than 2000 kPa-s.

11. The method of claim 8 wherein the compounded composition further comprises secondary rubber, processing aid, antidegradant, softener, or a combination thereof.

12. The method of claim 8 wherein the compound composition comprises from 1 to 30 phr clay.

13. The method of any one of claim 7 wherein the article comprises an innerliner or an innertube.

14. A tire comprising an innerliner made by the method of: compounding an elastomeric composition with 20 to 100 phr of a carbon black and curative;
wherein the elastomeric composition comprises a brominated interpolymer of isobutylene and from 8 to 10 weight percent p-methylstyrene and comprising from 0.2 to 2 mole percent bromomethylstyrene, a Mooney viscosity between 28 and 32, a number average molecular weight of between 200,000 and 240,000, a weight average molecular weight of between 320,000 and 440,000, a z average molecular weight of between 450,000 and 650,000, and a branching index (g') from 0.4 to 1.1; and wherein the elastomeric composition has a characteristic time for stress relaxation at 100° C. from an initially applied strain of 100% to 1 kPa of less than 300 seconds;
processing the compounded composition to form an innerliner shape in a tire; and
curing the composition to form the innerliner in the tire.

15. The tire of claim 14 wherein the innerliner has an air permeability less than $3.5 \times 10^{-8}$ cm$^3$-cm/cm$^2$-s-atm.

16. The tire of claim 14 comprising a characteristic inflation pressure retention of less than 2.25 percent loss per month.

17. The tire of claim 14 comprising a characteristic tire durability of at least 700 hours.

* * * * *